US011769088B2

(12) United States Patent
Halioris et al.

(10) Patent No.: US 11,769,088 B2
(45) Date of Patent: Sep. 26, 2023

(54) INTELLIGENT USER INTERFACE AND APPLICATION FOR OPERATIONS MANAGEMENT

(71) Applicant: United Parcel Service of America, Inc., Atlanta, GA (US)

(72) Inventors: Christopher Bryant Halioris, Crestwood, KY (US); Paul Overstreet, Louisville, KY (US); Brandon Scott Pry, Louisville, KY (US); Balakrishna Subramaniam, Prospect, KY (US)

(73) Assignee: UNITED PARCEL SERVICE OF AMERICA, INC., Atlanta, GA (US)

( * ) Notice: Subject to any disclaimer, the term of this patent is extended or adjusted under 35 U.S.C. 154(b) by 0 days.

(21) Appl. No.: 17/503,825

(22) Filed: Oct. 18, 2021

(65) Prior Publication Data

US 2022/0036285 A1 Feb. 3, 2022

Related U.S. Application Data

(63) Continuation of application No. 16/050,882, filed on Jul. 31, 2018, now Pat. No. 11,151,488.

(Continued)

(51) Int. Cl.
*G06Q 10/0631* (2023.01)
*G06F 3/04842* (2022.01)

(Continued)

(52) U.S. Cl.
CPC . *G06Q 10/063114* (2013.01); *G06F 3/04842* (2013.01); *G06Q 10/08* (2013.01); *G06Q 10/1091* (2013.01)

(58) Field of Classification Search
None
See application file for complete search history.

(56) References Cited

U.S. PATENT DOCUMENTS 6,954,737 B2 * 10/2005 Kalantar .......... G06Q 10/06311
705/50
7,155,400 B1 12/2006 Jilk et al.
(Continued)

OTHER PUBLICATIONS

Robin et al (Project Management for Mining Handbook for Delivering Project Success), Dec. 2015, Society for Mining, Metallurgy & Exploration (SME), Pages (Year: 2015).*

(Continued)

*Primary Examiner* — Romain Jeanty
(74) *Attorney, Agent, or Firm* — Shook, Hardy & Bacon L.L.P.

(57) ABSTRACT

A first feature is displayed within a first view of a user interface. A first selection of the first feature is configured to display a first set of identifiers corresponding to one or more tasks. A second feature is displayed within the first view of the user interface. A second selection of the second feature is configured to display a second set of identifiers corresponding to a set of workers. Each worker of the set of workers is associated with the one or more tasks and a first time that the one or more tasks are scheduled to be completed by. A set of status indicators are displayed. Each status indicator of the set of status indicators indicates whether the one or more tasks have been completed by the first time for the each worker of the set of workers based at least in part on the associating.

20 Claims, 24 Drawing Sheets

Related U.S. Application Data

(60) Provisional application No. 62/538,975, filed on Jul. 31, 2017.

(51) Int. Cl.
*G06Q 10/1091* (2023.01)
*G06Q 10/08* (2023.01)

(56) References Cited

U.S. PATENT DOCUMENTS

| | | | |
|---|---|---|---|
| 7,707,249 | B2 | 4/2010 | Spataro et al. |
| 8,548,606 | B2 | 10/2013 | Kashyap et al. |
| 9,413,707 | B2 | 8/2016 | Roman et al. |
| 9,466,039 | B2 | 10/2016 | Gatti et al. |
| 9,594,801 | B2 | 3/2017 | Wong |
| 9,818,075 | B2 | 11/2017 | Roman et al. |
| 10,140,291 | B2 | 11/2018 | Brunn et al. |
| 10,200,496 | B2 | 2/2019 | Karunamurthi et al. |
| 10,449,003 | B2 | 10/2019 | Reid et al. |
| 10,504,044 | B2 | 12/2019 | Johnson et al. |
| 10,521,752 | B1* | 12/2019 | Williamson ... G06Q 10/063112 |
| 10,546,272 | B2 | 1/2020 | Cartledge et al. |
| 10,607,171 | B1 | 3/2020 | Dobbins |
| 10,607,771 | B2 | 3/2020 | Dobbs |
| 10,783,468 | B2 | 9/2020 | Sanger |
| 2008/0244584 | A1* | 10/2008 | Smith .................. G06F 9/4881 718/102 |
| 2009/0063238 | A1* | 3/2009 | Storzum .......... G06Q 10/06398 705/7.42 |
| 2011/0311380 | A1* | 12/2011 | Andersen .............. H02K 5/203 310/54 |
| 2014/0278638 | A1* | 9/2014 | Kreuzkamp ..... G06Q 10/06398 705/7.15 |
| 2015/0095080 | A1 | 4/2015 | Gatti et al. |
| 2016/0085591 | A1 | 3/2016 | Taira et al. |
| 2016/0378642 | A1 | 12/2016 | Adams |
| 2017/0061357 | A1* | 3/2017 | Dubey .......... G06Q 10/063112 |
| 2017/0091697 | A1 | 3/2017 | Haas et al. |
| 2017/0116561 | A1 | 4/2017 | Saddler et al. |
| 2018/0129992 | A1 | 5/2018 | Lord et al. |
| 2019/0034855 | A1 | 1/2019 | Halioris et al. |

OTHER PUBLICATIONS

Martijn "Task-Based User Interface Design", Dec. 2001, Task-Based User Interface Design, pp. 1-217 (Year: 2001).*

Martijn et al., "Task-based User Interface Design", Academisch Proefschrift, 2001, pp. 1-205.

* cited by examiner

← MOOKIE WILSON ⚠

| REMAINING DAYS | | ATTENDANCE | | 1 MONTH |
|---|---|---|---|---|
| VACATION | OPTION | NO CALL | CALL IN | LATE |
| 7 | 2 | 1 | 5 | 10 |

1403 — (left box)   1405 — (right box)

1412 — ALL    ATTENDANCE    ACTIVITY — 1411

1409

○ 9/27/16    CONVEYOR SECURING
○ 9/26/16    METHODS EVAL - LOAD    90%
● 9/26/16    LATE
○ 9/23/16    PCM -- WEARING EAR...
● 9/14/16    CALL IN
○ 9/13/16    INJURY
○ 9/09/16    DOK    95%
◉ 9/09/16    100% PACKAGE HAND...
◉ 8/30/16    FOUND SALT

RECORDS: 11

INTELLIGENT USER INTERFACE AND APPLICATION FOR OPERATIONS MANAGEMENT

CROSS-REFERENCE TO RELATED APPLICATIONS

This application is a continuation of U.S. patent application Ser. No. 16/050,882 filed Jul. 31, 2018, which claims priority to U.S. Provisional Patent Application No. 62/538,975 entitled "SUPERVISOR MOBILE ASSISTANT," filed Jul. 31, 2017, each of which is herein incorporated by reference in its entirety.

TECHNICAL FIELD

The present disclosure generally relates to operator interfaces and specific applications. In particular, this disclosure relates to user interfaces and applications for managing one or more tasks or operations.

BACKGROUND

Individuals, such as supervisors, may have to keep track of various tasks that a group of workers have to perform. However, these individuals may have difficulty simultaneously monitoring and tracking each worker's performance for a given work day. Yet it is crucial to make sure that each worker is performing to their capacity and that company resources are not wasted. For example, supervisors in the shipping industry may need to manage various operations in parallel, such as ensuring that workers employ correct loading mechanics for loading parcels (e.g., packages, containers, letters, items, pallets or the like) into a vehicle, ensuring that conveyer belt apparatuses are functioning correctly for efficient parcel sorting, determining how full a loading vehicle is, etc. However, these supervisors may only have limited resources for managing these tasks.

Conventional user interfaces and other software technologies in the shipping and other industries include applications that statically keep track of when a worker has clocked in/out or applications that statically receive manual user input into a field that indicates whether a worker has completed some task. These user interfaces may also be complicated and arduous to use for user navigation. Therefore, a need exists for an intelligent user interface and applications that can more closely track multiple workers' activities and/or unit of equipment throughout a working period. A need also exists for user interfaces that include additional relevant views of information associated with one or more operations, such as various status indicators and identifiers indicating the task due for a particular time period for each worker. A need further exists for dynamic user interfaces that are intuitive to use thereby increasing user navigation speed.

SUMMARY

Various embodiments of the present disclosure are directed to a computer implemented method, an apparatus, and a computer program product. In one aspect, a computer-implemented method includes the following processes. A first feature is displayed within a first view of a user interface. A first selection of the first feature is configured to display a first set of identifiers corresponding to one or more tasks. A second feature is displayed within the first view of the user interface. A second selection of the second feature is configured to display a second set of identifiers corresponding to a set of workers. Each worker of the set of workers is associated with the one or more tasks and a first time that the one or more tasks are scheduled to be completed by. A set of status indicators are displayed. Each status indicator of the set of status indicators indicates whether the one or more tasks have been completed by the first time for the each worker of the set of workers based at least in part on the associating.

In another aspect, an apparatus includes at least one processor and at least one memory storing computer program code. The at least one memory and the computer program code can be configured to, with the at least one processor, cause the apparatus to perform the following processes. One or more workers are associated with one or more tasks that are scheduled to be completed. In response to the associating, a first view of a user interface is displayed. The first view indicates the one or more tasks that the one or more workers are scheduled to perform and one or more identifiers that identify the one or more workers. It may be inferred, via one or more sensors, whether the one or more workers have completed the one or more tasks. At least one status indicator is displayed within the first view. The at least one status indicator indicates whether the one or more workers have completed the one or more tasks based at least on the inferring from the one or more sensors.

In yet another aspect, a computer program product comprises at least one non-transitory computer-readable storage medium having computer-executable program code instructions stored therein. The computer-executable program code instructions can include program code instructions configured to, when executed by a processor of a computing system, cause the computing system to perform the following operations. Each worker of a set of workers are associated with one or more tasks that are scheduled to be completed by a first time. It is determined whether the each worker of the set of workers has completed the one or more tasks by the first time. Based at least in part on the determining whether the each worker of the set of workers has completed one or more tasks by the first time, at least one score is generated. The at least one score is indicative of an impact on an entity as a result of the each worker completing or not completing the one or more tasks by the first time. The at least one score is displayed on a first view of a user interface.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

Figure 6A:
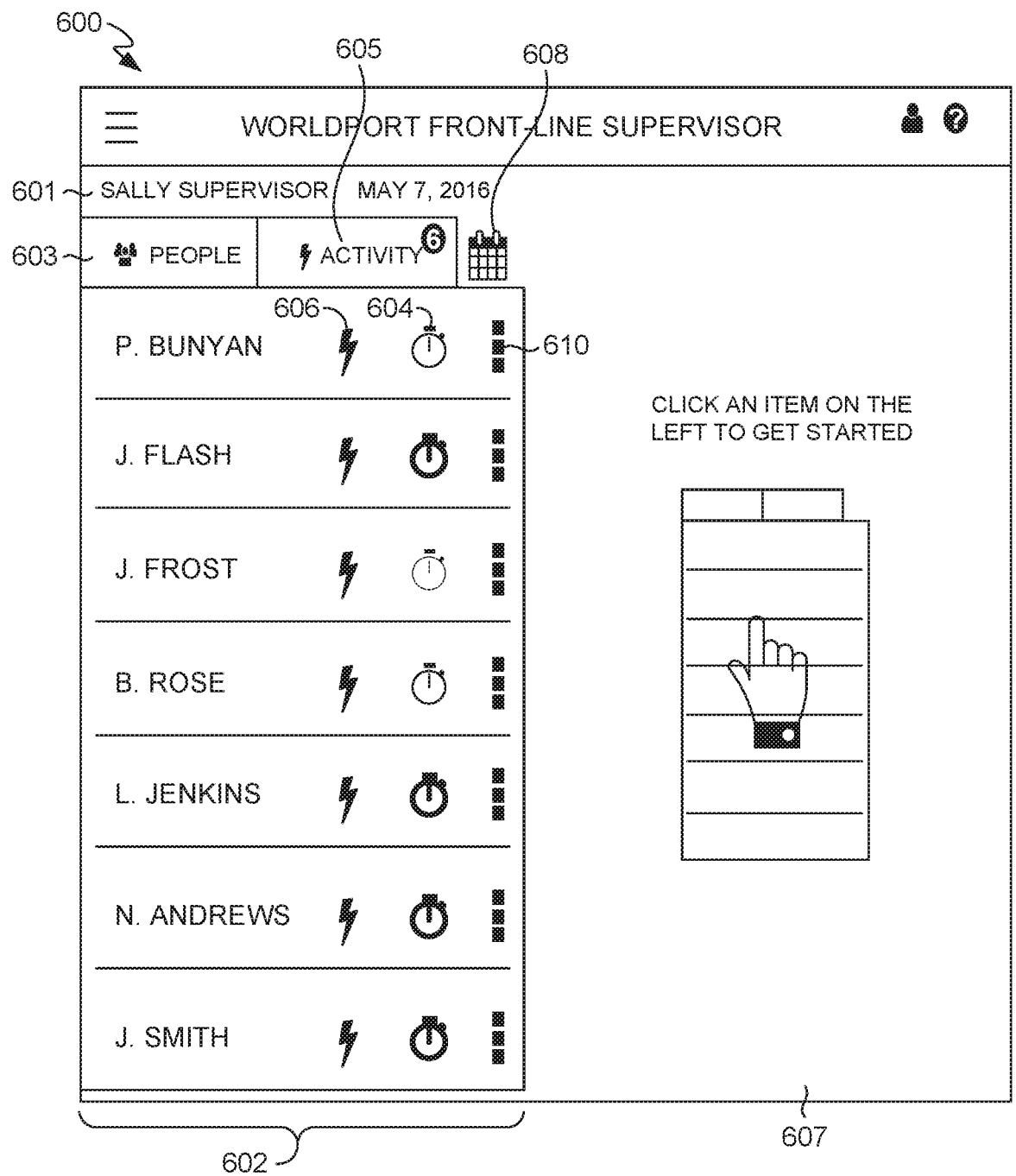

FIG. 6A schematically depicts a particular view of an operations management system user interface, according to certain embodiments.

Figure 6B:
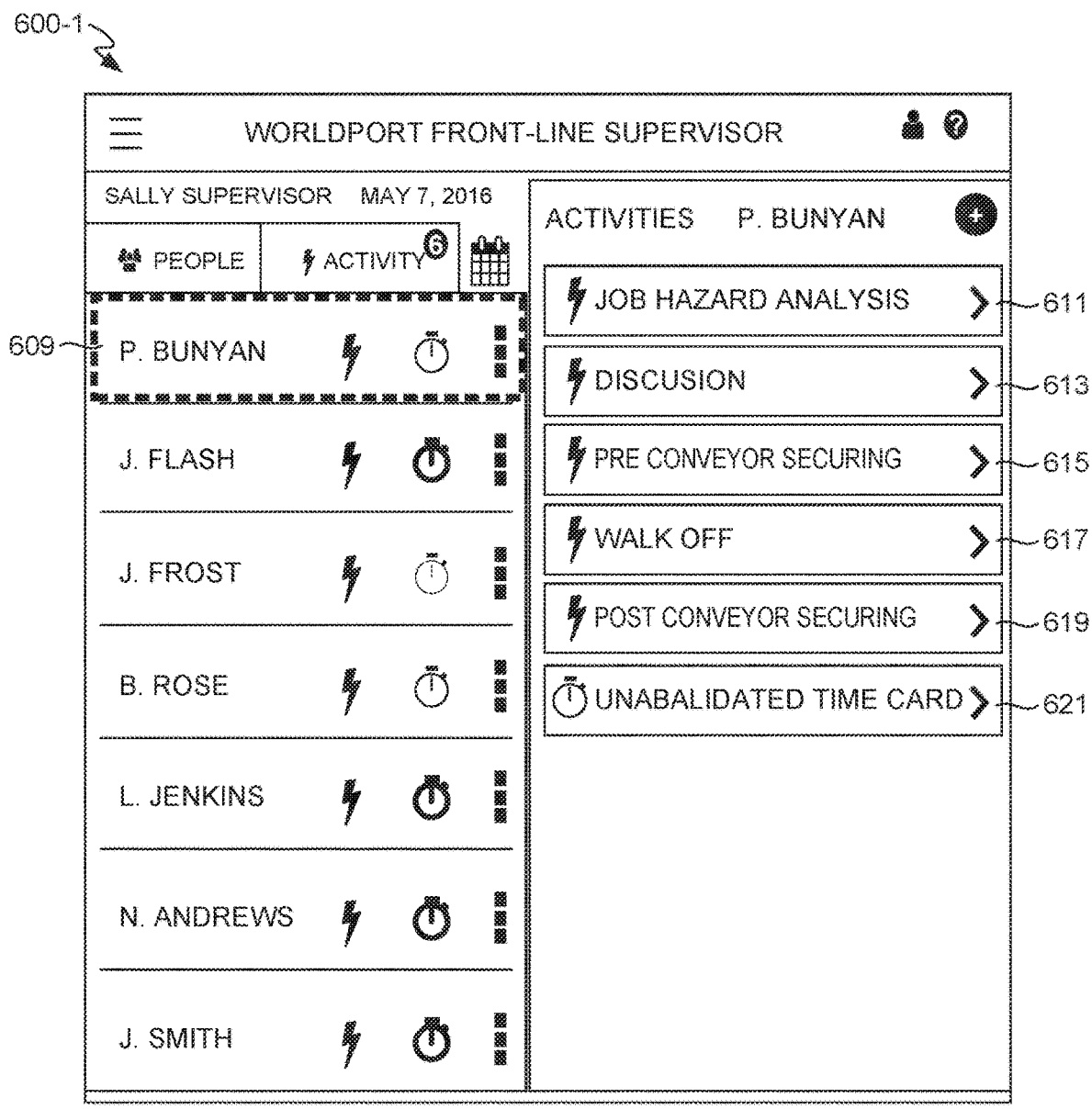

FIG. 6B schematically depicts a particular view of an operations management system user interface, according to certain embodiments.

Figure 7A:
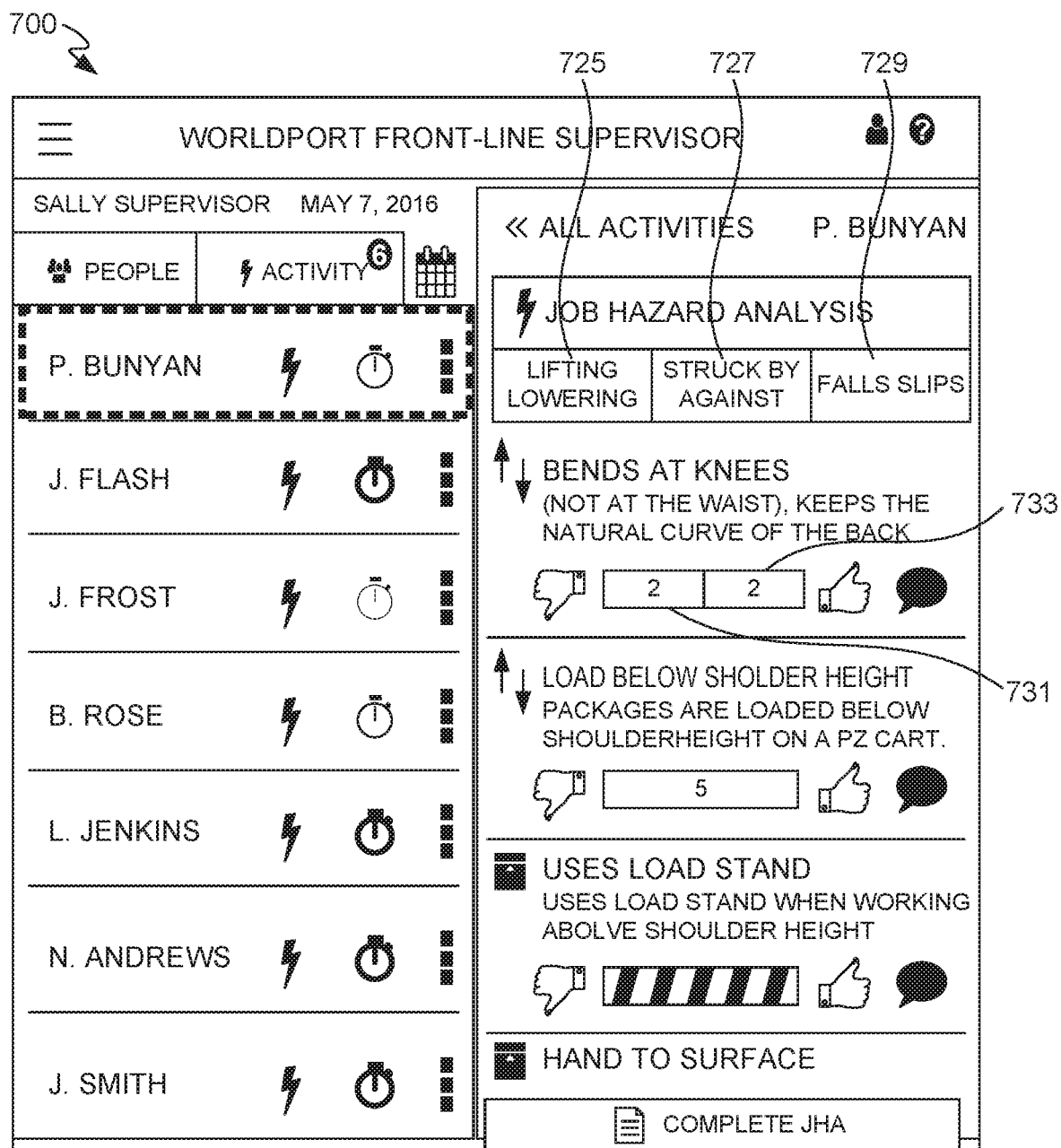

FIG. 7A schematically depicts a particular view of an operations management system user interface, according to certain embodiments.

Figure 7B:
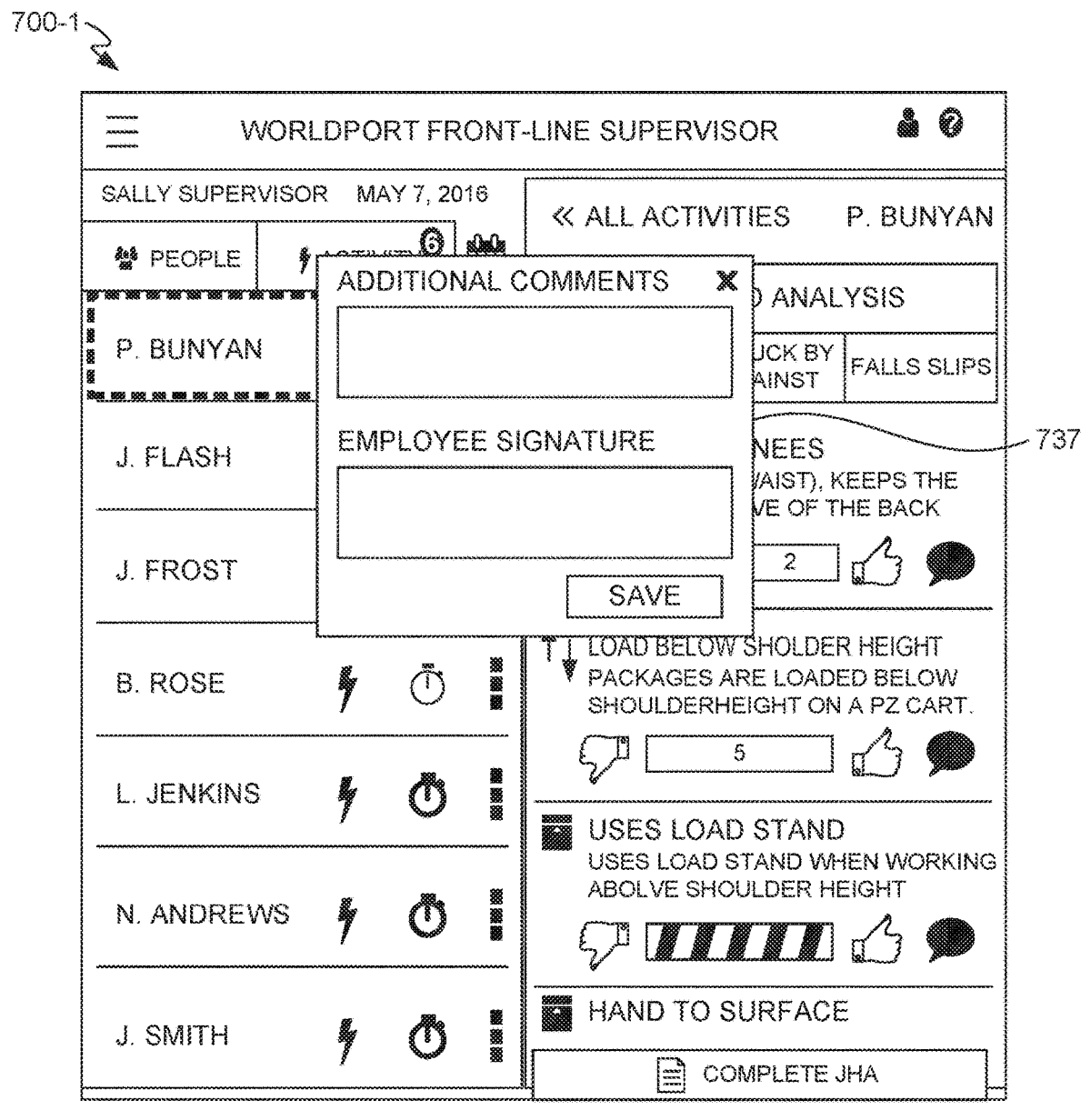

FIG. 7B schematically depicts a particular view of an operations management system user interface, according to certain embodiments.

Figure 8A:
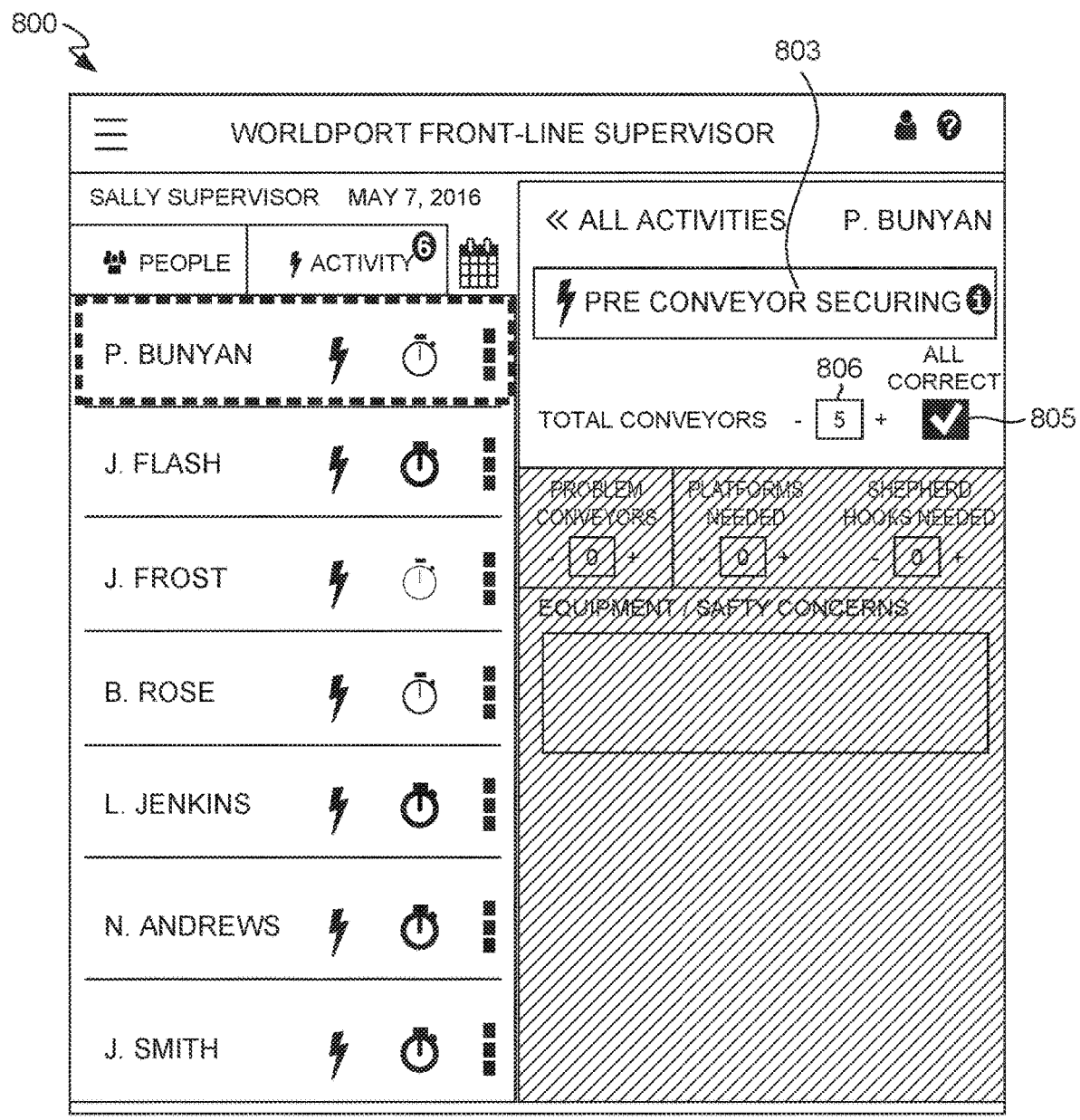

FIG. 8A schematically depicts a particular view of an operations management system user interface, according to certain embodiments.

Figure 8B:
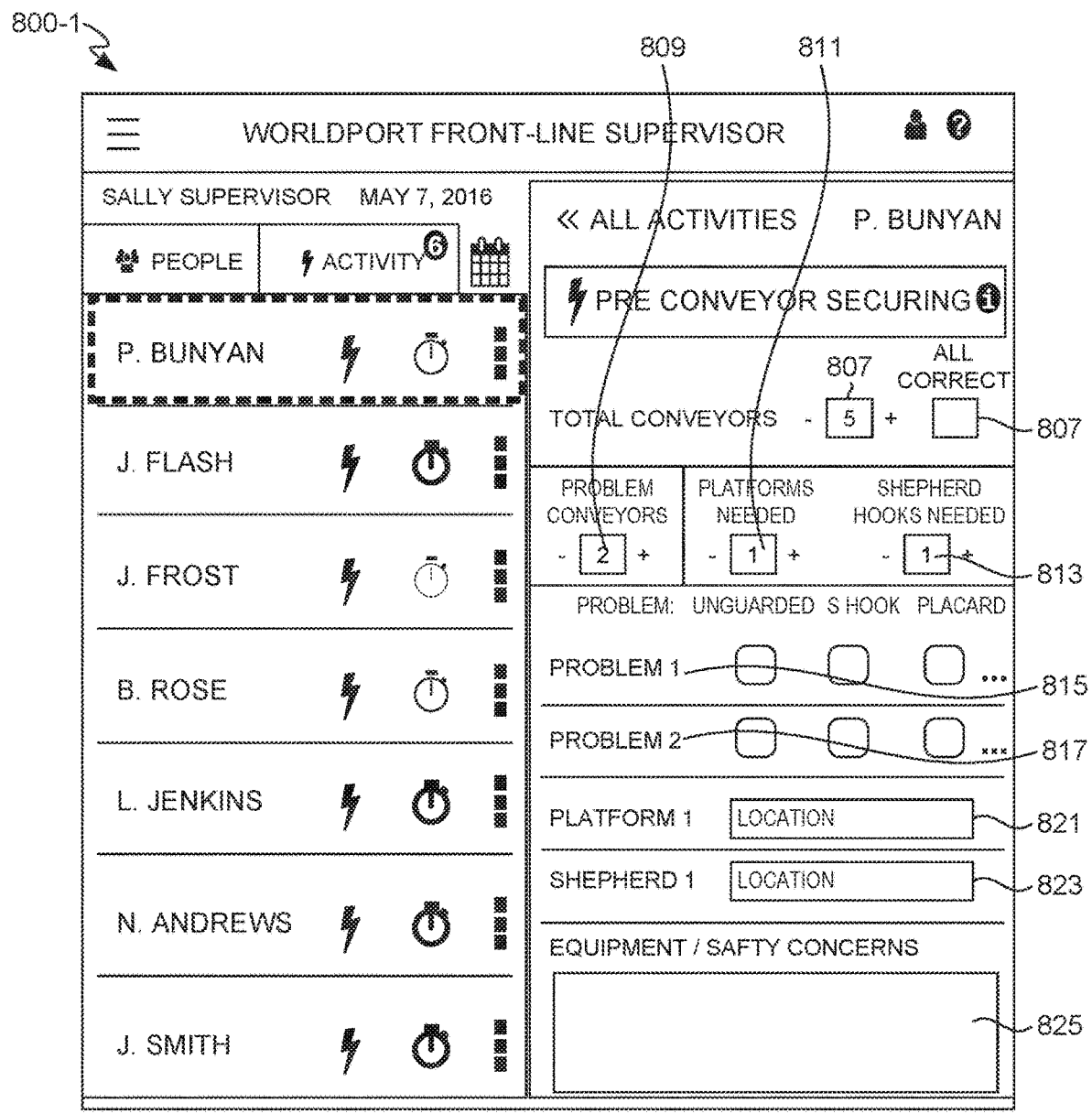

FIG. 8B schematically depicts a particular view of an operations management system user interface, according to certain embodiments.

Figure 9:
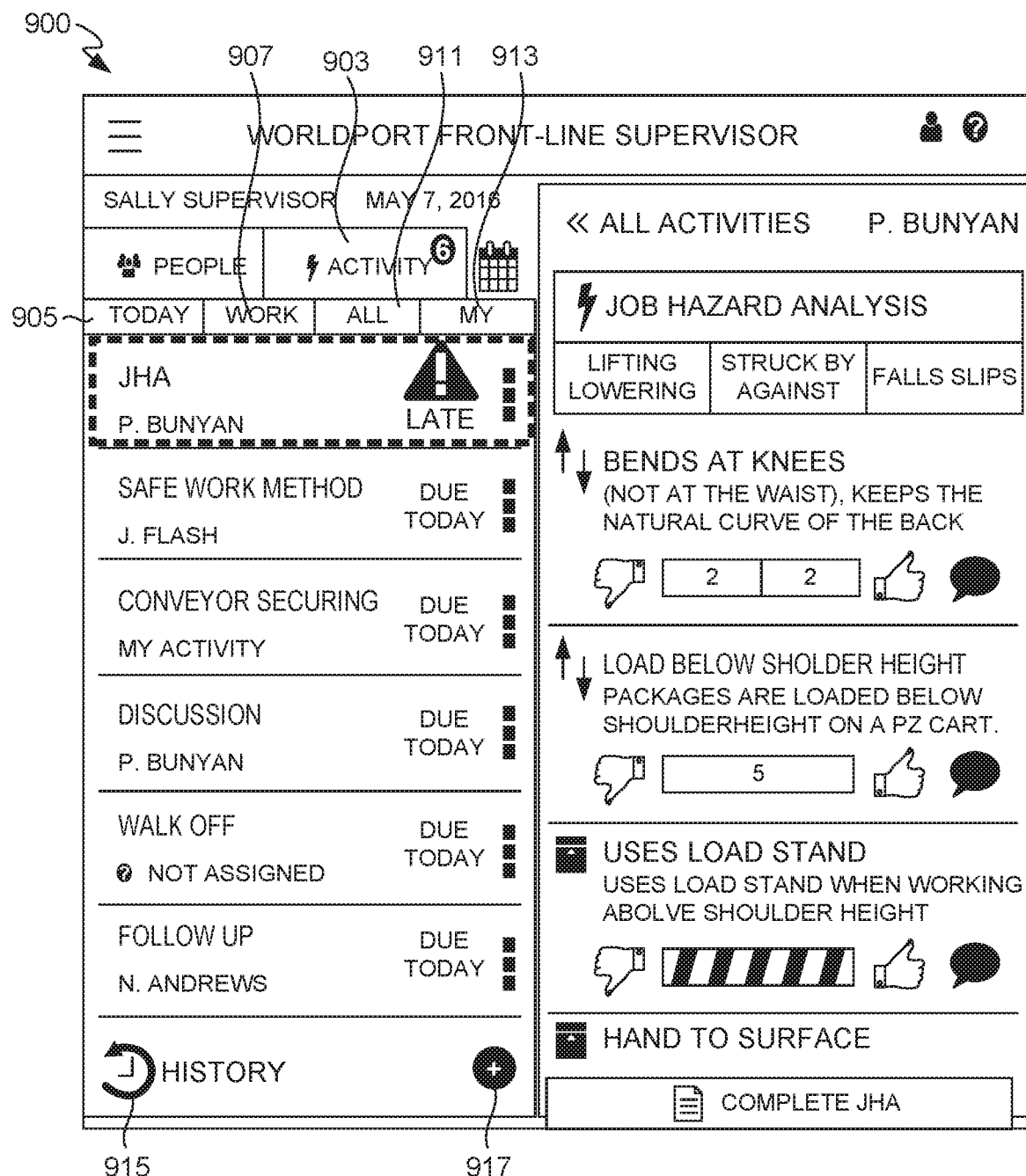

FIG. 9 schematically depicts a particular view of an operations management system user interface, according to certain embodiments.

Figure 10:
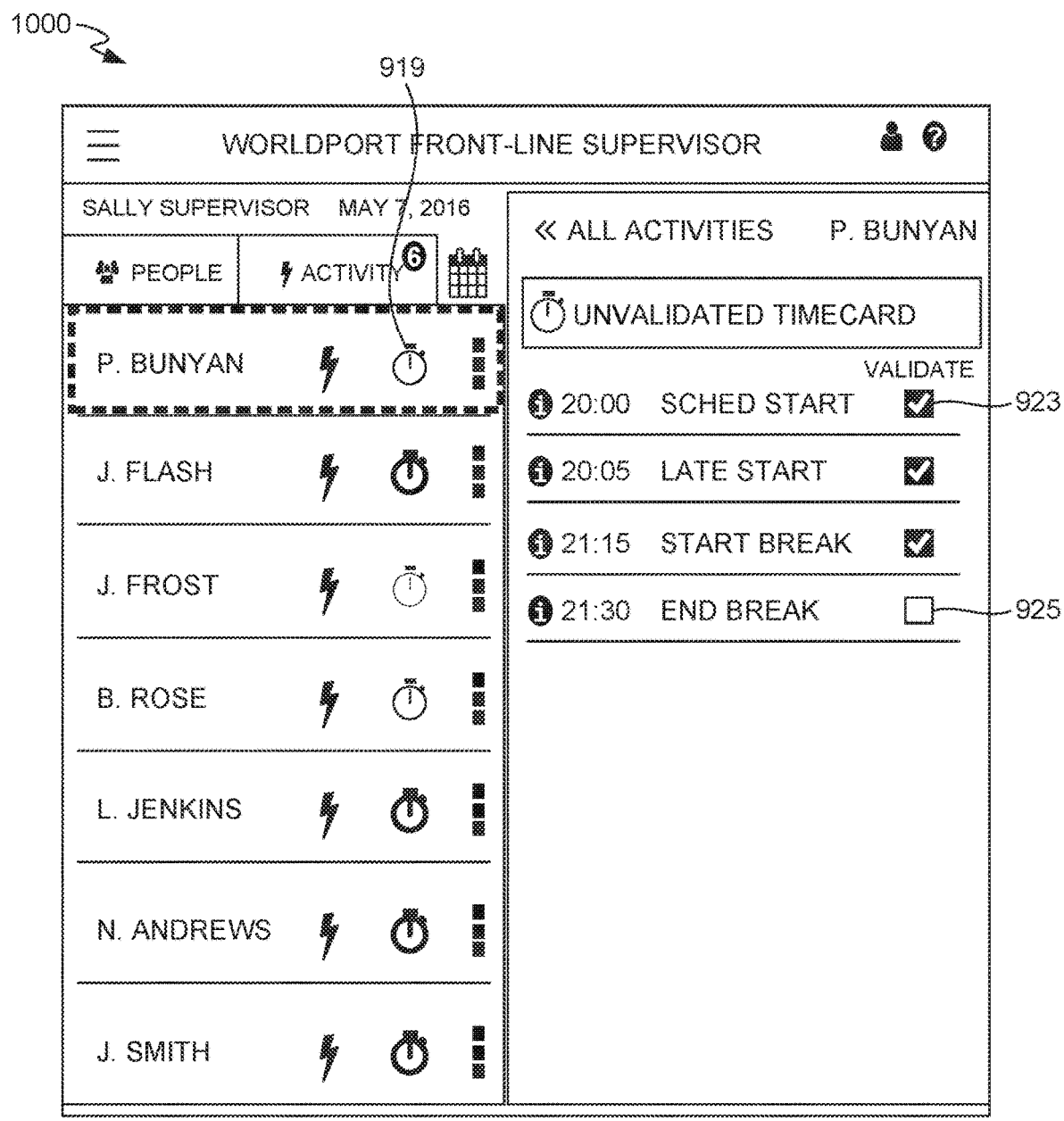

FIG. 10 schematically depicts a particular view of an operations management system user interface, according to certain embodiments.

Figure 11:
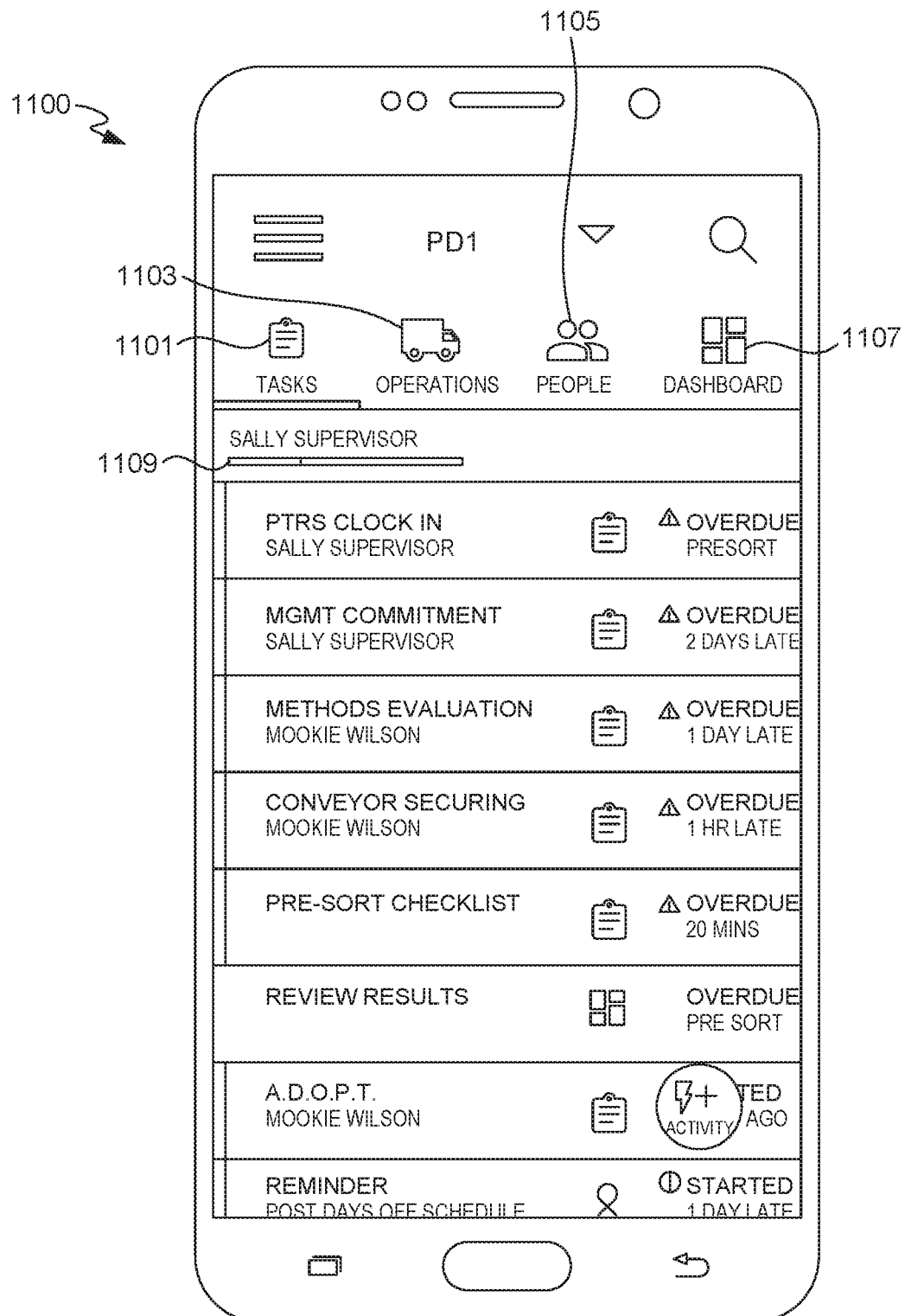

FIG. 11 schematically depicts a mobile device with a particular view of an operations management system user interface, according to certain embodiments.

Figure 12:
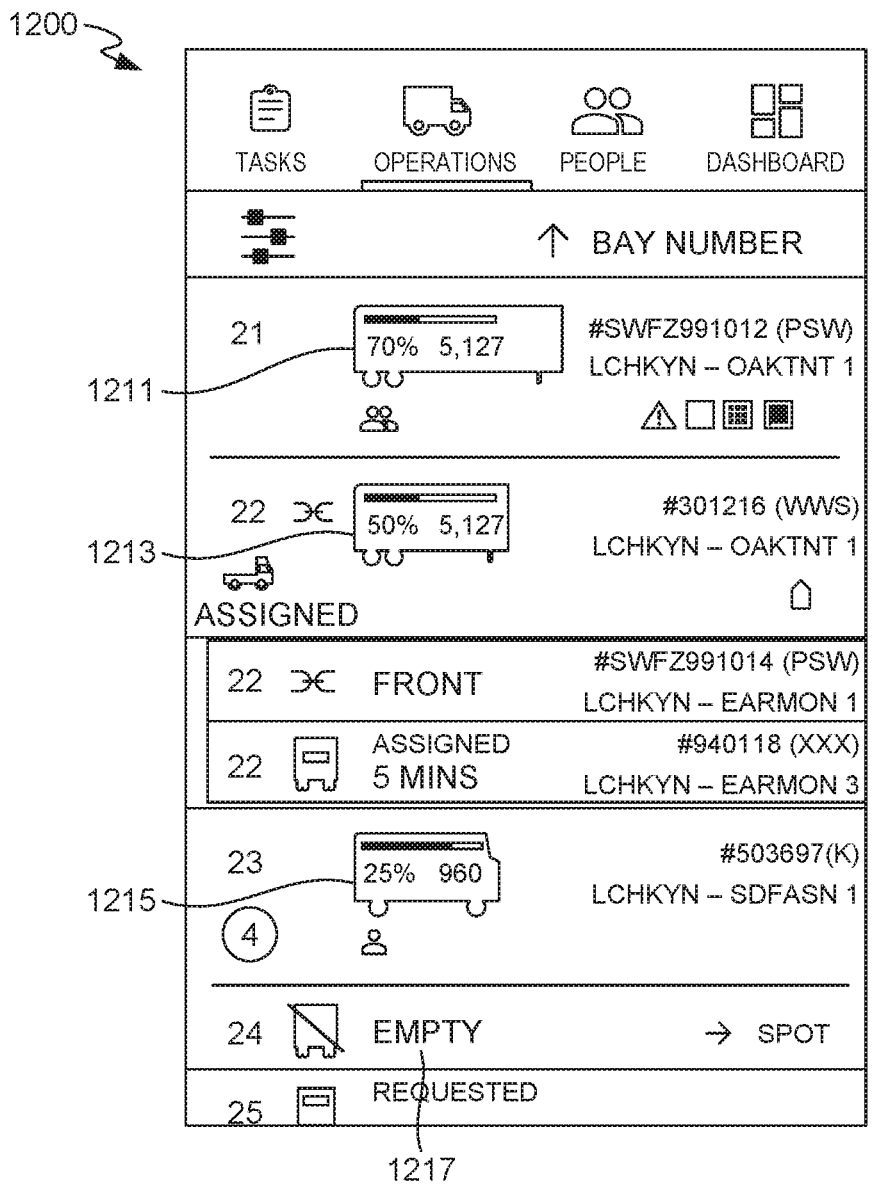

FIG. 12 schematically depicts a particular view of an operations management system user interface, according to certain embodiments.

Figure 13:
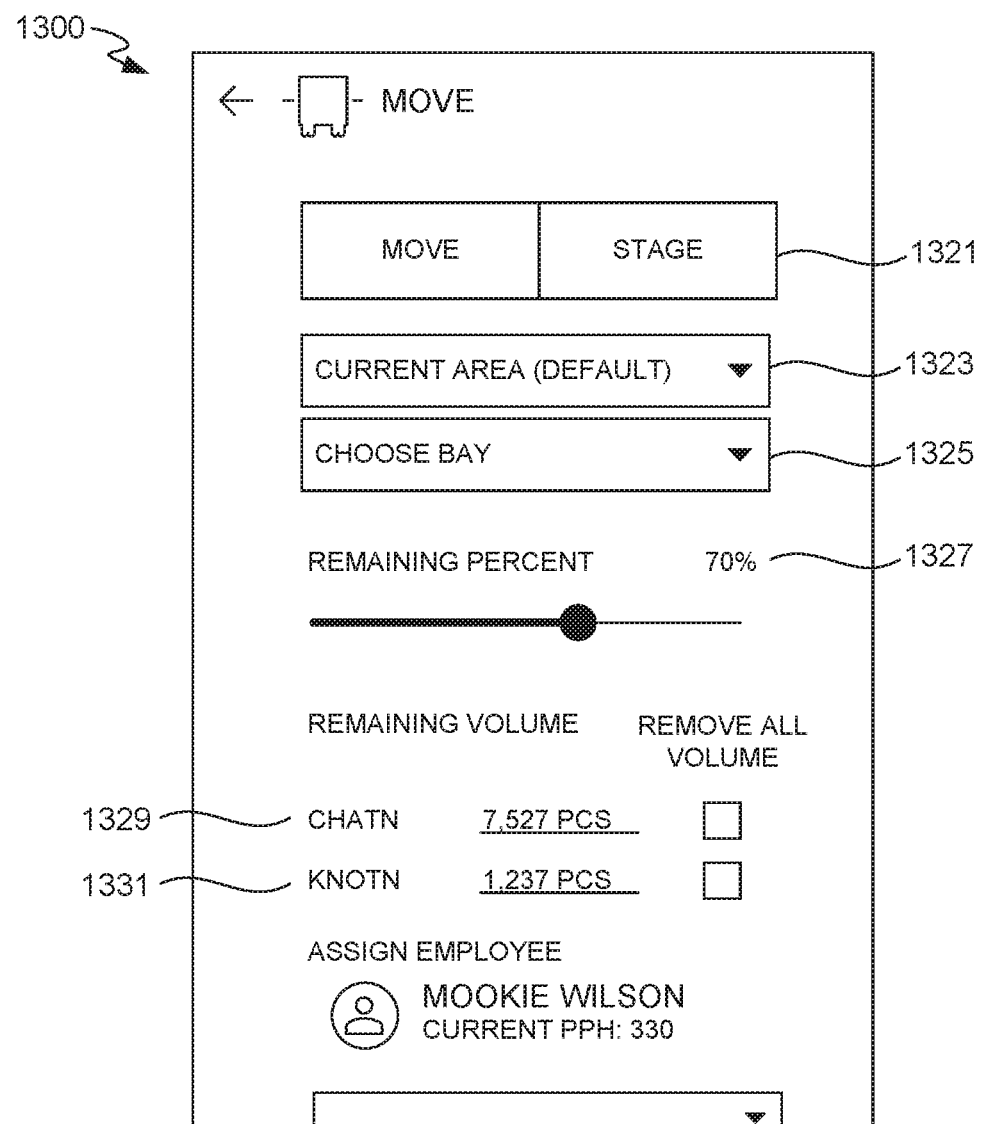

FIG. 13 schematically depicts a particular view of an operations management system user interface, according to certain embodiments.

Figure 14A:
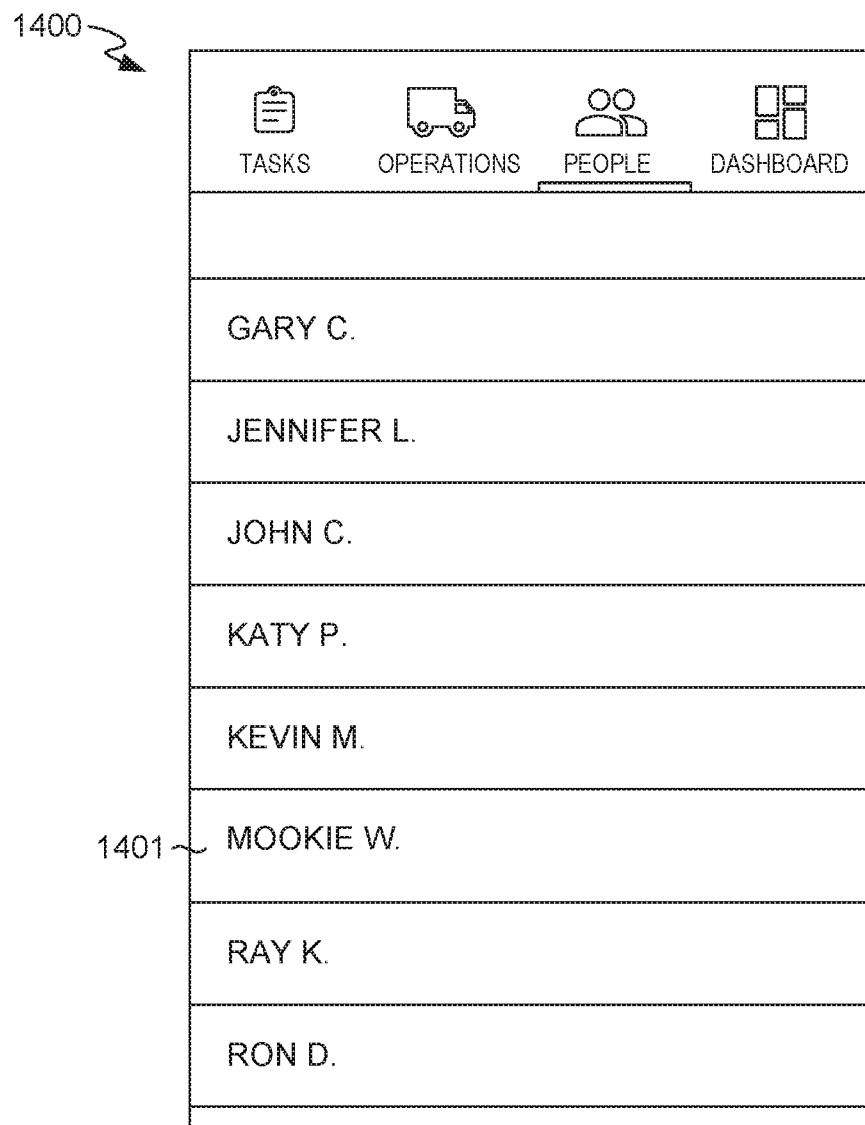

FIG. 14A schematically depicts a particular view of an operations management system user interface, according to certain embodiments.

FIG. 14B schematically depicts a particular view of an operations management system user interface, according to certain embodiments.

Figure 15:

FIG. 15 schematically depicts a particular view of an operations management system user interface, according to certain embodiments.

Figure 16:
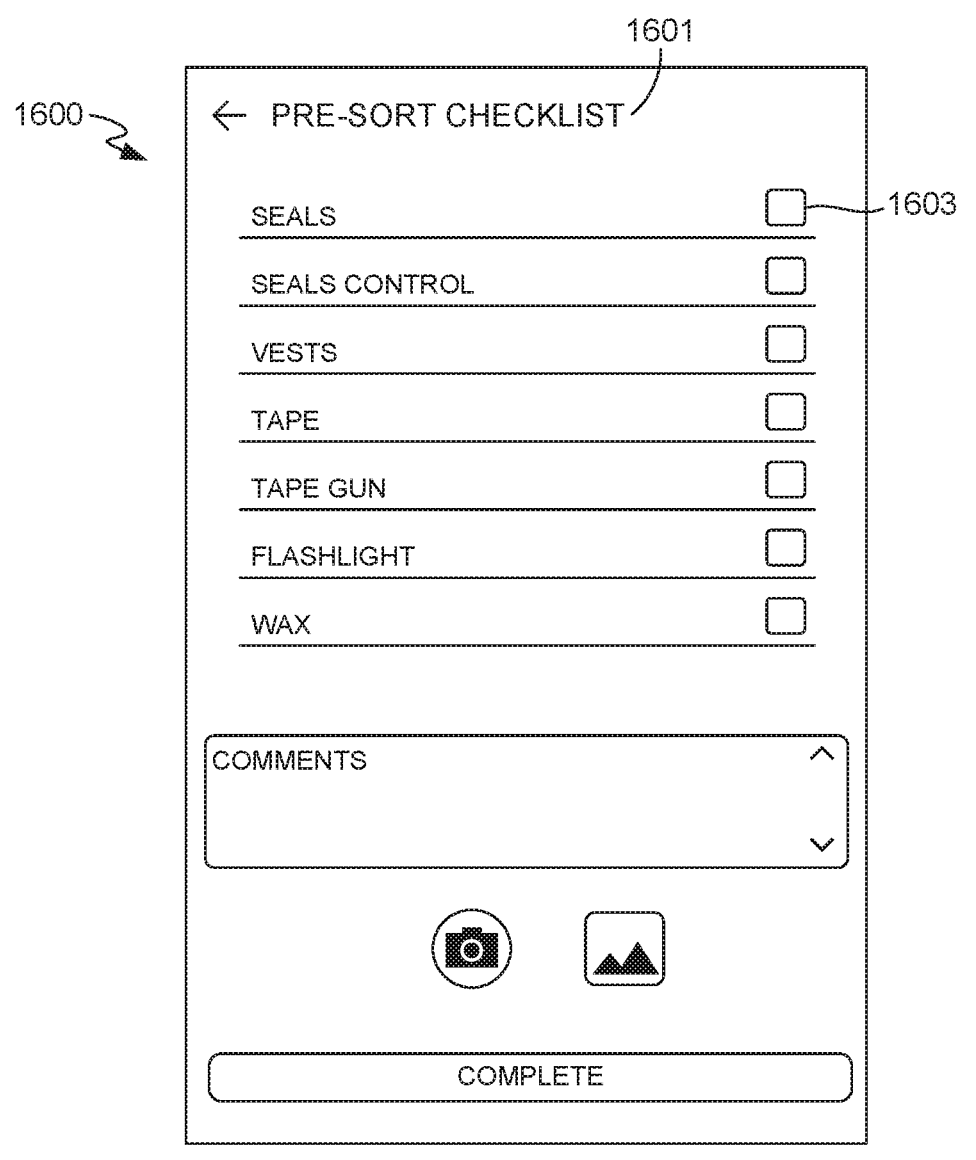

FIG. 16 schematically depicts a particular view of an operations management system user interface, according to certain embodiments.

Figure 17:
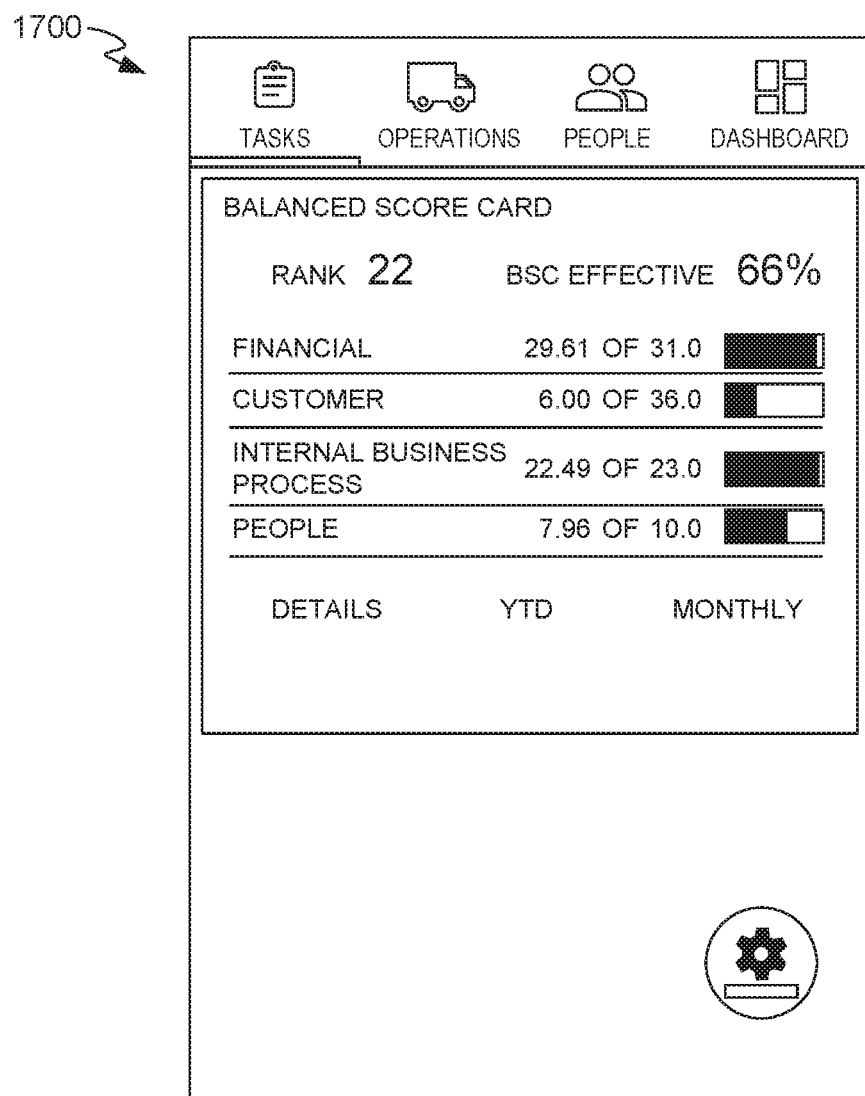

FIG. 17 schematically depicts a particular view of an operations management system user interface, according to certain embodiments.

Figure 18:
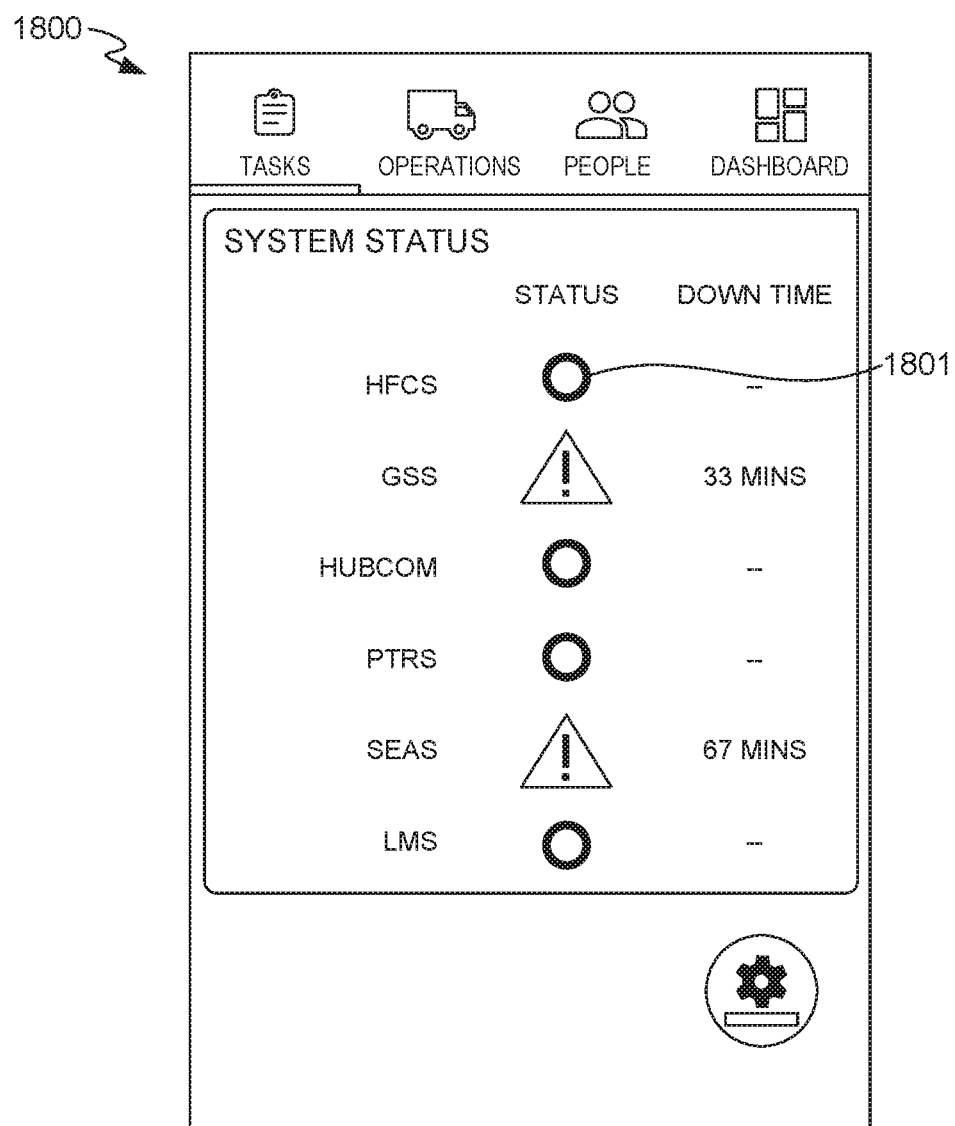

FIG. 18 schematically depicts a particular view of an operations management system user interface, according to certain embodiments.

Figure 19:
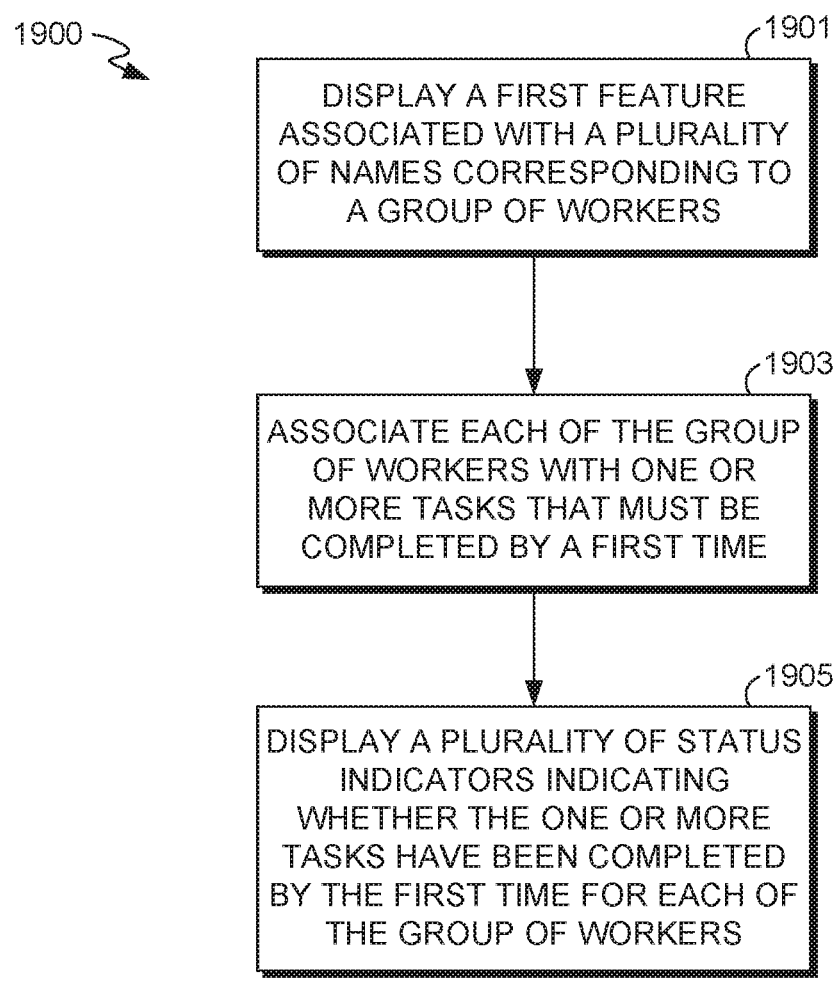

FIG. 19 is a flow diagram that depicts displaying a plurality of status indicators showing whether one or more tasks have been completed by a first time, according to certain embodiments.

Figure 20:
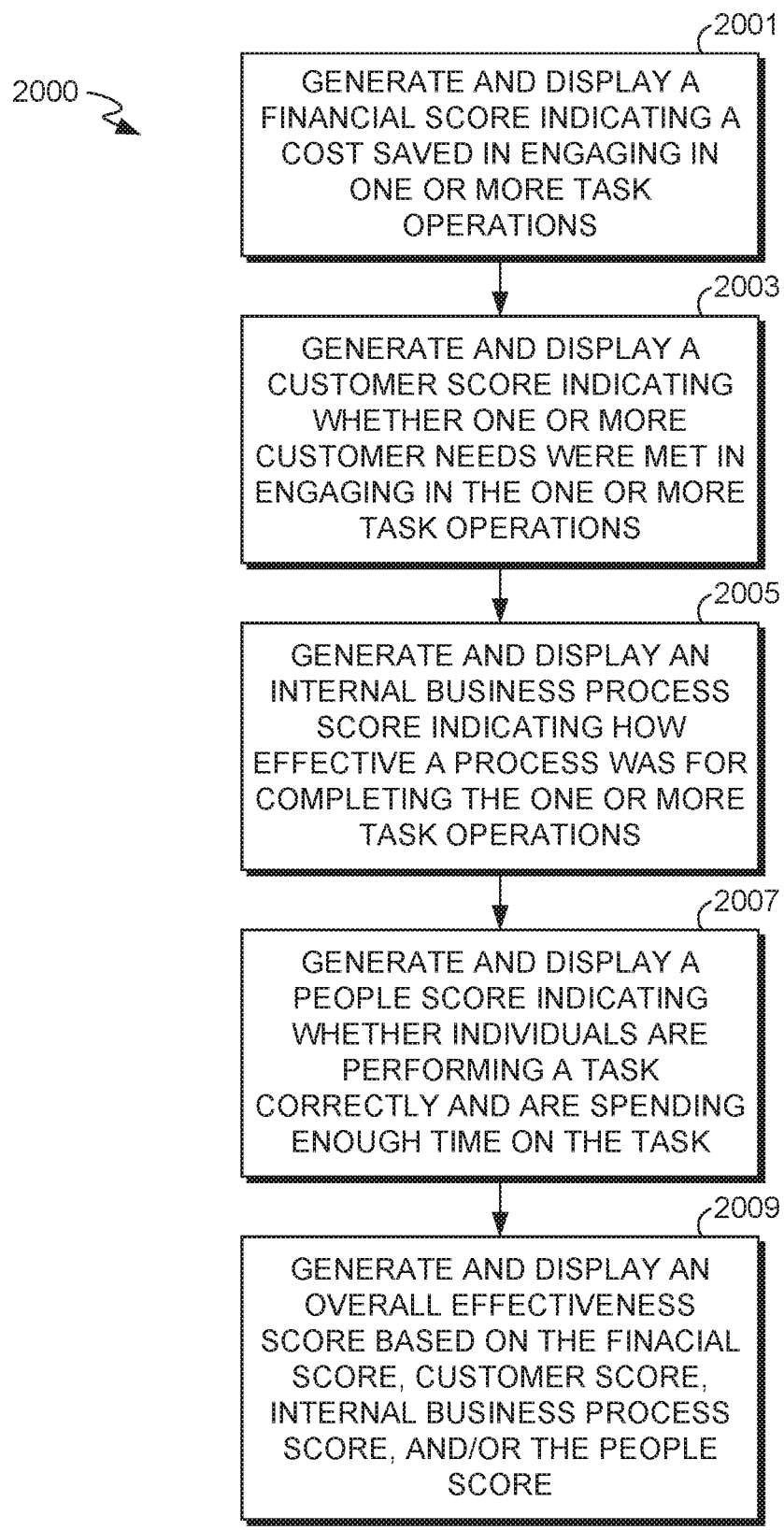

FIG. 20 is a flow diagram that depicts generating and displaying an overall effectiveness score based on other individual scores, according to certain embodiments.

DESCRIPTION

Various embodiments of the present disclosure now will be described more fully hereinafter with reference to the accompanying drawings, in which some, but not all embodiments of the disclosures are shown. Indeed, these disclosures may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

I. Computer Program Products, Methods, and Computing Entities

Embodiments of the present disclosure may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double information/data rate synchronous dynamic random access memory (DDR SDRAM), double information/data rate type two synchronous dynamic random access memory (DDR2 SDRAM), double information/data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. However, embodiments of the present disclosure may also take the form of an entirely hardware embodiment performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

II. Exemplary System Architecture

Figure 1:
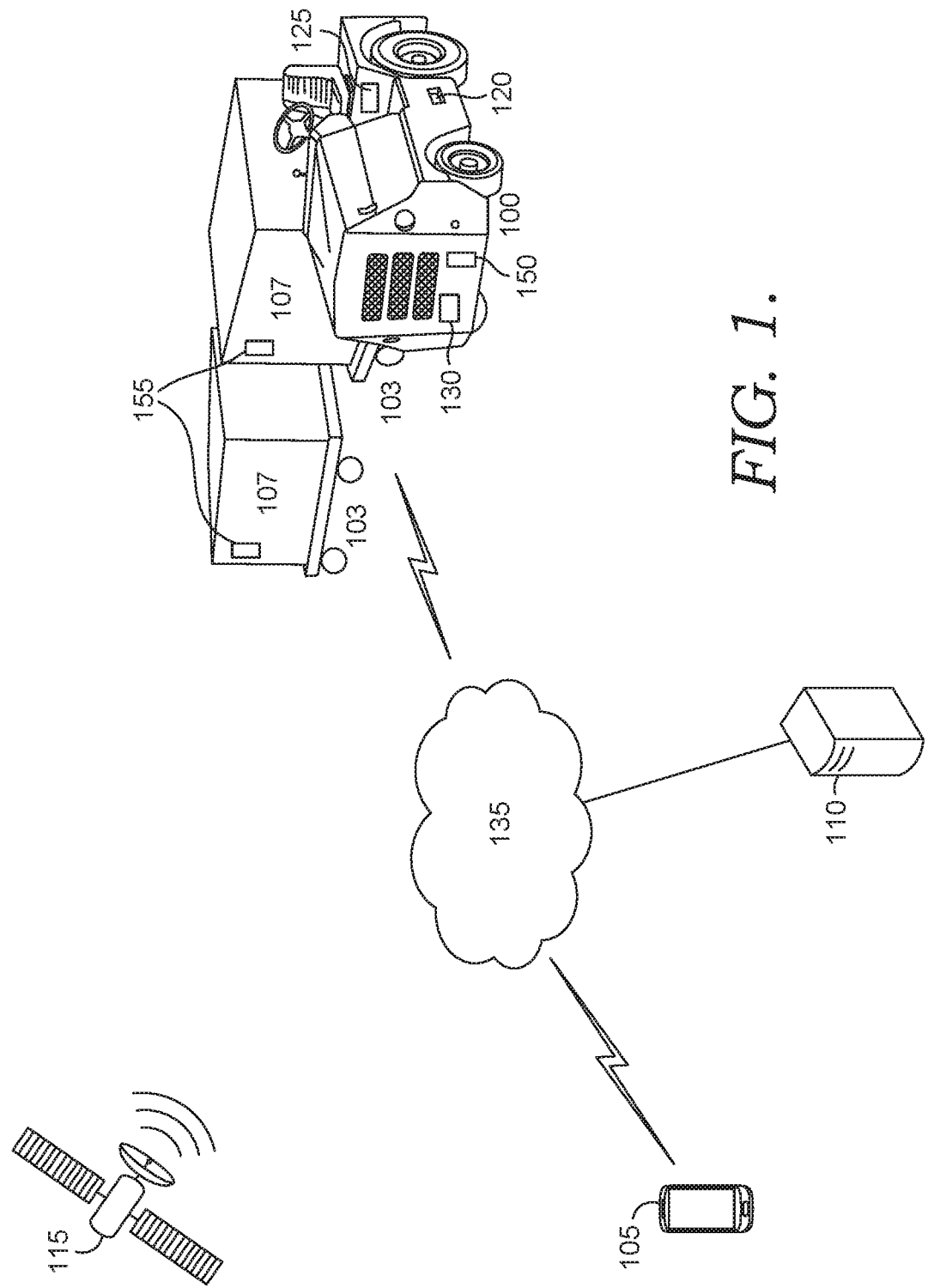
FIG. 1 is a diagram of a system that can be used to practice various embodiments of the present disclosure.

FIG. 1 provides an illustration of a system that can be used in conjunction with various embodiments of the present disclosure. As shown in FIG. 1, the system may include one or more powered assets 100, one or more non-powered assets 103, one or more containers 107, one or more items 109 (not shown), one or more mobile computing entities 105, one or more management computing entities 110, one or more Global Positioning System (GPS) satellites 115, one or more location sensors 120, one or more telematics sensors 125, one or more information/data collection devices 130, one or more networks 135, one or more badge-reader station computing entities 140, one or more badges 145, one or more powered asset beacon 150, one or more container beacon 155, and/or the like. Each of the components of the system may be in electronic communication with, for example, one another over the same or different wireless or wired networks including, for example, a wired or wireless Personal Area Network (PAN), Local Area Network (LAN), Metropolitan Area Network (MAN), Wide Area Network (WAN), or the like. Additionally, while FIG. 1 illustrates certain system entities as separate, standalone entities, the various embodiments are not limited to this particular architecture.

a. Exemplary Powered Asset

In various embodiments, the term powered asset 100 is used generically. For example, a powered asset 100 may be a tug, tractor, truck, car, van, flatbed, vehicle, aircraft-pushback tractor, cargo loader, forklift, and/or the like. As will be recognized, in many cases, a powered asset 100 may be configured to push, pull, lift, or otherwise move a non-powered asset 103. Further, each powered asset 100 may be associated with a unique powered asset identifier (such as a powered asset ID) that uniquely identifies the powered asset 100. The unique powered asset ID may include characters, such as numbers, letters, symbols, and/or the like. For example, an alphanumeric powered asset ID (e.g., "AS445") may be associated with each powered asset 100. In another embodiment, the unique powered asset ID may be a registration number or other identifying information/data assigned to the powered asset 100.

Figure 2:
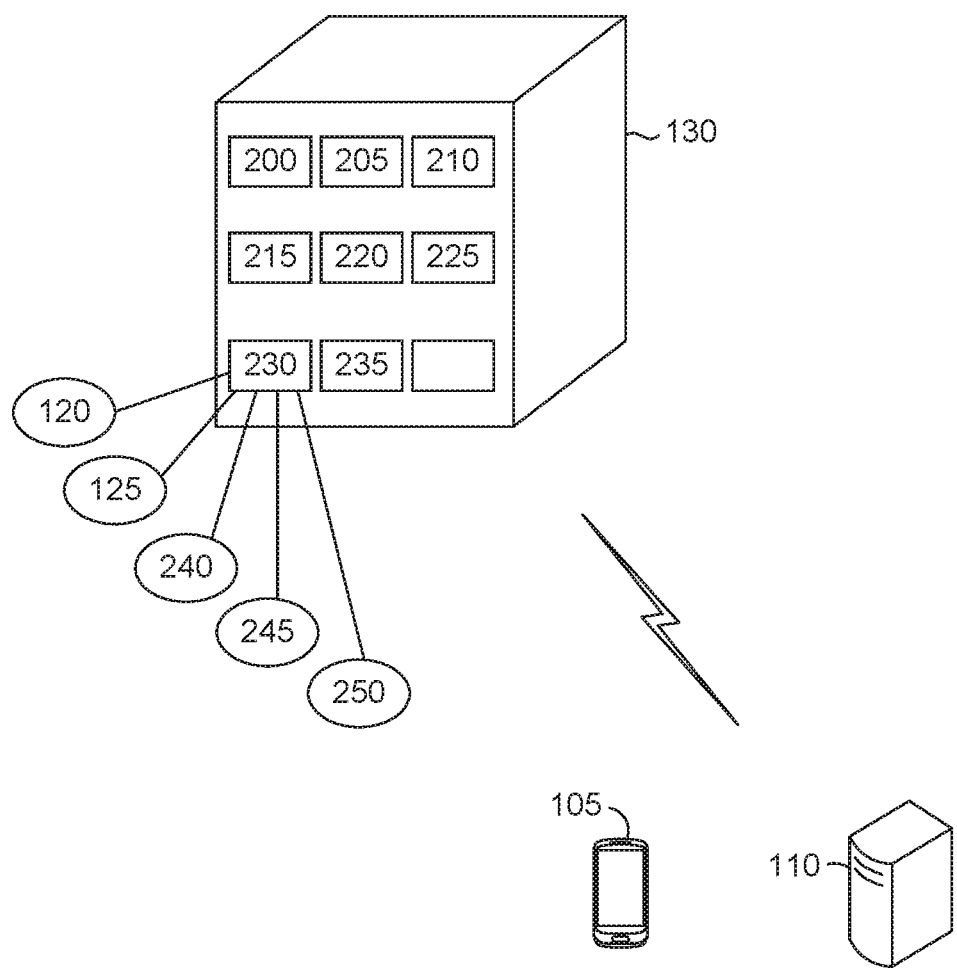
FIG. 2 is a diagram of an information/data collection device that may be used in association with certain embodiments of the present disclosure.

FIG. 1 shows one or more computing entities, devices, and/or similar words used herein interchangeably that are associated with the powered asset 100, such as an information/data collection device 130 or other computing entities. In general, the terms computing entity, entity, device, system, and/or similar words used herein interchangeably may refer to, for example, one or more computers, computing entities, desktop computers, mobile phones, tablets, phablets, notebooks, laptops, distributed systems, watches, glasses, beacons, key fobs, radio frequency identification (RFID) tags, ear pieces, scanners, televisions, dongles, cameras, wristbands, wearable items/devices, items/devices, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. FIG. 2 provides a block diagram of an exemplary information/data collection device 130 that may be attached, affixed, disposed upon, integrated into, or part of a powered asset 100. The information/data collection device 130 may collect telematics information/data (including location data) and transmit/send the information/data to the mobile computing entity 105, the management computing entity 110, and/or various other computing entities via one of several communication methods.

In one embodiment, the information/data collection device 130 may include, be associated with, or be in wired or wireless communication with one or more processors 200 (various exemplary processors are described in greater detail below), one or more location-determining devices or one or more location sensors 120 (e.g., Global Navigation Satellite System (GNSS) sensors), one or more telematics sensors 125, one or more real-time clocks 215, a J-Bus protocol architecture, one or more electronic control modules (ECM) 245, one or more communication ports 230 for receiving telematics information/data from various sensors (e.g., via a CAN-bus), one or more communication ports 205 for transmitting/sending data, one or more RFID tags/sensors 250, one or more power sources 220, one or more information/data radios 235 for communication with a variety of communication networks, one or more memory modules 210, and one or more programmable logic controllers (PLC) 225. It should be noted that many of these components may be located in the powered asset 100 but external to the information/data collection device 130. Thus, each of the components may be referred to individually or collectively as a powered asset computing entity.

In one embodiment, the one or more location sensors 120, modules, or similar words used herein interchangeably may be one of several components in wired or wireless communication with or available to the information/data collection device 130. Moreover, the one or more location sensors 120 may be compatible with GPS satellites 115, such as Low Earth Orbit (LEO) satellite systems, Department of Defense (DOD) satellite systems, the European Union Galileo positioning systems, Global Navigation Satellite systems (GLONASS), the Chinese Compass navigation systems, Indian Regional Navigational satellite systems, and/or the like. Furthermore, the one or more location sensors 120 may be compatible with Assisted GPS (A-GPS) for quick time to first fix and jump starting the ability of the location sensors 120 to acquire location almanac and ephemeris data, and/or be compatible with Satellite Based Augmentation System (SBAS) such as Wide Area Augmentation System (WAAS), European Geostationary Navigation Overlay Service (EGNOS), and/or MTSAT Satellite Augmentation System (MSAS), GPS Aided GEO Augmented Navigation (GAGAN) to increase GPS accuracy. This information/data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, triangulation may be used in connection with a device associated with a particular powered asset and/or the powered asset's operator and with various communication points (e.g., cellular towers or Wi-Fi access points) positioned at various locations throughout a geographic area to monitor the location of the powered asset 100 and/or its operator. The one or more location sensors 120 may be used to receive latitude, longitude, altitude, heading or direction, geocode, course, position, time, and/or speed information/data (e.g., referred to herein as telematics information/data and further described herein below). The one or more location sensors 120 may also communicate with the tracking computing entity 110, the information/data collection device 130, mobile computing entity 105, and/or similar computing entities.

As indicated, in addition to the one or more location sensors 120, the information/data collection device 130 may include and/or be associated with one or more telematics sensors 125, modules, and/or similar words used herein interchangeably. For example, the telematics sensors 125 may include powered asset sensors, such as engine, fuel, odometer, hubometer, tire pressure, location, weight, emissions, door, and speed sensors. The telematics information/data may include, but is not limited to, speed data, emissions data, RPM data, tire pressure data, oil pressure data, seat belt usage data, distance data, fuel data, idle data, and/or the like (e.g., referred to herein as telematics data). The telematics sensors 125 may include environmental sensors, such as air quality sensors, temperature sensors, and/or the like. Thus, the telematics information/data may also include carbon monoxide (CO), nitrogen oxides (NOx), sulfur oxides (SOx), Ethylene Oxide (EtO), ozone (O3), hydrogen sulfide (H2S) and/or ammonium (NH4) data, and/or meteorological information/data (e.g., referred to herein as telematics data).

In one embodiment, the ECM 245 may be one of several components in communication with and/or available to the information/data collection device 130. The ECM 245, which may be a scalable and subservient device to the information/data collection device 130, may have information/data processing capability to decode and store analog and/or digital inputs from powered asset systems and sensors. The ECM 245 may further have information/data processing capability to collect and present telematics information/data to the J-Bus (which may allow transmission to the information/data collection device 130), and output standard powered asset diagnostic codes when received from a powered asset's J-Bus-compatible on-board controllers 240 and/or sensors.

Additionally, each powered asset 100 may have a powered asset beacon 150 attached or affixed thereto. As will be recognized, a beacon may take many forms. For instance, a beacon may be a BLE beacon (e.g., a URIBeacon, an AltBeacon, or an iBeacon), an RFID tag/sensor, an NFC device, a Wi-Fi device, and/or the like. The powered asset beacon 150 can include some or all of the following components: one or more input interfaces for receiving information/data, one or more output interfaces for transmitting information/data, a processor, a clock, memory modules, one or more sensors for sensing and detecting various information/data, and a power source. The power source may be a source provided by the powered asset, an energy storage device (e.g., a battery, a supercapacitor, and/or the like), an energy harvesting device (e.g., a solar panel, a vibration energy harvester, a thermal energy harvester, a RF energy harvester, and/or the like), and/or the like. In one embodiment, each powered asset beacon 150 can store one or more unique identifiers, such as a global unique identifier (GUID), a universally unique identifier (UUID), a character string, an alphanumeric string, text string, and/or the like. The unique identifier may identify the associated powered asset 100 and/or powered asset beacon. Via various communication standards and protocols, the powered asset beacon 150 associated with the powered asset 100 can be communicated with, interrogated, read, and/or the like. For example, a container beacon 155 associated with a container 107 can communicate with the powered asset beacon 150 associated with the powered asset 100 using multiple wireless communication standards and protocols, including Bluetooth, Wibree, NFC, Wi-Fi, ZigBee, and/or any other wireless protocol or standard. The powered asset beacon 150 associated with the powered asset 100 may also be in direct or indirect communication with the management computing entity 110, the information/data collection device 130, mobile computing entity 105, and/or similar computing entities over the same or different wired or wireless networks.

As will be recognized, a powered asset beacon 150 can be used to sense and/or detect various information/data. For example, a powered asset beacon 150 can be capable of sensing temperature information/data, pressure information/data, altitude information/data, vacuum information/data, vibration information/data, shock information/data, humidity information/data, moisture information/data, light information/data, air information/data, and/or the like. In one embodiment, a powered asset beacon 150 may be operated in one or more operating modes, such as advertising mode, listening mode, sleep mode, and/or the like. In advertising mode, the powered asset beacon 150 may transmit an advertising signal regularly, periodically (e.g., 10 times/second), and/or continuously. The advertising signal may include one or more unique identifiers (e.g., powered asset information and/or unique powered asset beacon identifier), received signal strength indicator (RSSI), and/or other information/data. In listening mode, the powered asset beacon 150 is capable of receiving signals transmitted by other beacons and/or other computing entities. In sleep mode, the powered asset beacon 150 may cut power to unneeded subsystems and place the other subsystems (e.g., receiver, processor) into a configurable low power state (e.g., with just sufficient power for the powered asset beacon 150 to detect triggers/events for it to change/switch from sleep mode into other operational modes (e.g., listening mode, advertising mode)). The change of the operational mode may be triggered by various configurable triggers/events, such as pressure, altitude, motion, location, light, sound, time, signal transmitted from another beacon and/or an appropriate computing entity, a switch, a button, combinations thereof, and/or the like.

As indicated, a communication port 230 may be one of several components available in the information/data collection device 130 (or be in or as a separate computing entity). Embodiments of the communication port 230 may include an Infrared information/data Association (IrDA) communication port, an information/data radio, and/or a serial port. The communication port 230 may receive instructions for the information/data collection device 130. These instructions may be specific to the powered asset 100 in which the information/data collection device 130 is installed, specific to the geographic area in which the powered asset 100 will be traveling, specific to the function the powered asset 100 serves within a fleet, and/or the like. In one embodiment, the information/data radio 235 may be configured to communicate with a wireless wide area network (WWAN), wireless local area network (WLAN), wireless personal area network (WPAN), or any combination thereof. For example, the information/data radio 235 may communicate via various wireless protocols, such as 802.11, general packet radio service (GPRS), Universal Mobile Telecommunications System (UMTS), Code Division Multiple Access 2000 (CDMA2000), CDMA2000 1x (1xRTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols (including Bluetooth Low Energy (BLE)), wireless universal serial bus (USB) protocols, and/or any other wireless protocol.

b. Exemplary Non-Powered Assets

In various embodiments, a non-powered asset 103 may be any dolly, trailer, chassis, stacker truck, side loader, pallet truck, hand truck, handcart, roller deck, slave pallet, container trailer, pallet trailer, cargo trailer, cargo cart and/or the like. As will be recognized, a non-powered asset 103 may be configured to be pushed, pulled, lifted, or otherwise moved. The non-powered asset 103 may transport one or more one or more containers 107 storing one or more items 109 (which may be stored in containers 107). Further, each non-powered asset 103 may be associated with a unique non-powered asset identifier (such as a non-powered asset ID) that uniquely identifies the non-powered asset 103. The unique non-powered asset ID may include characters, such as numbers, letters, symbols, and/or the like. For example, an alphanumeric non-powered asset ID (e.g., "7221A445533AS449") may be associated with each non-powered asset 103.

In one embodiment, each non-powered asset 103 may be associated with one or more RFID tags/sensors, beacons, computing entities, and/or the like. In one embodiment, each non-powered asset 103 can be capable of sensing temperature information/data, pressure information/data, altitude information/data, vacuum information/data, vibration information/data, shock information/data, humidity information/data, moisture information/data, light information/data, air information/data, and/or the like. Thus, each non-powered asset may be configured to collect information/data and communicate various information/data using multiple wireless communication standards and protocols, such as GPRS, UMTS, CDMA2000, 1xRTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

c. Containers and/or Items

In one embodiment, a container 107 is configured to store and transport one or more items (e.g., shipments, packages, pallets, etc.) of varying shapes and sizes. For instance, in various embodiments, a container 107 may be a unit load device (ULD) used to store and transport items 109 on an aircraft. An item 109 may be any tangible and/or physical object. In one embodiment, an item may be or be enclosed in one or more packages, envelopes, parcels, bags, goods, products, loads, crates, items banded together, drums, the like, and/or similar words used herein interchangeably.

In one embodiment, each container 107 and/or item 109 may include and/or be associated with a unique tracking identifier, such as an alphanumeric identifier. Such tracking identifiers may be represented as text, barcodes, tags, character strings, Aztec Codes, MaxiCodes, information/data Matrices, Quick Response (QR) Codes, electronic representations, and/or the like. A unique tracking identifier (e.g., 1Z123456789) may be used by a carrier to identify and track containers 107 and items 109 as they move through a carrier's transportation network. For example, information/data comprising a tracking identifier can be read, scanned, transmitted, and/or the like to provide and/or identify/determine the location of a container 107 and/or item 109. As will be recognized, items 109 can be associated with a container 107 and therefore associated items 109 can considered to be located in the container 107 at the determined location of the container 107. These can be referred to as "logical" scans/determinations or "virtual" scans/determinations.

Such tracking identifiers can be affixed to items by, for example, using a sticker (e.g., label) with the unique tracking identifier printed thereon (in human and/or machine readable form). In other embodiments, a container beacon 155 or an RFID tag may be affixed to or associated with each container 107 and/or item 109 and store a unique tracking identifier. As previously noted, a beacon may take many forms. For example, a beacon may be a BLE beacon (e.g., a URIBeacon, an AltBeacon, or an iBeacon), an RFID tag/sensor, an NFC device, a Wi-Fi device, and/or the like. The container beacon 155 can include some or all of the following components: one or more input interfaces for receiving information/data, one or more output interfaces for transmitting information/data, a processor, a clock, memory modules, one or more sensors for sensing and detecting various information/data, and a power source. The power source may be an energy storage device (e.g., a battery, a supercapacitor, and/or the like), an energy harvesting device (e.g., a solar panel, a vibration energy harvester, a thermal energy harvester, a RF energy harvester, and/or the like), and/or the like. In one embodiment, each container beacon 155 can store one or more unique identifiers, such as a GUID, a UUID, a character string, an alphanumeric string, text string, and/or the like. The unique identifier may identify the associated container 107 (and/or item 109) and/or container beacon 155. Via various communication standards and protocols, the container beacon 155 associated with the container 107 and/or item 109 can be communicated with, interrogated, read, and/or the like. For example, the container beacon 155 associated with the container 107 and/or item 109 can communicate with a powered asset beacon 150 associated with a powered asset 100 using multiple wireless communication standards and protocols, including Bluetooth, Wibree, NFC, Wi-Fi, ZigBee, and/or any other wireless protocol or standard. The container beacon 155 associated with the container 107 and/or item 109 may also be in direct or indirect communication with a management computing entity 110, an information/data collection device 130, a mobile computing entity 105, and/or similar computing entities over the same or different wired or wireless networks.

As will be recognized, a container beacon 155 can be used to sense and detect various information/data. For example, a container beacon 155 can be capable of sensing temperature information/data, pressure information/data, altitude information/data, vacuum information/data, vibration information/data, shock information/data, humidity information/data, moisture information/data, light information/data, air information/data, and/or the like. In one embodiment, a container beacon 155 may be operated in one or more operating modes, such as advertising mode, listening mode, sleep mode, and/or the like. In advertising mode, the container beacon 155 may transmit an advertising signal regularly, periodically (e.g., 10 times/second), and/or continuously. The advertising signal may include one or more unique identifiers (e.g., unique container identifier and/or unique container beacon identifier), RSSI, and/or other information/data. In listening mode, the container beacon 155 is capable of receiving signals transmitted by other beacons, and/or an appropriate computing entities. In sleep mode, the container beacon 155 may cut power to unneeded subsystems and place the other subsystems (e.g., receiver, processor) into a configurable low power state (e.g., with just sufficient power for the container beacon 155 to detect triggers/events for it to change/switch from sleep mode into other operational modes (e.g., listening mode, advertising mode)). The change of the operational mode may be triggered by various configurable triggers/events, such as pressure, altitude, motion, light, location, sound, time, signal transmitted from another beacon and/or an appropriate computing entity, a switch, a button, combinations thereof, and/or the like.

d. Exemplary Management Computing Entity

Figure 3:
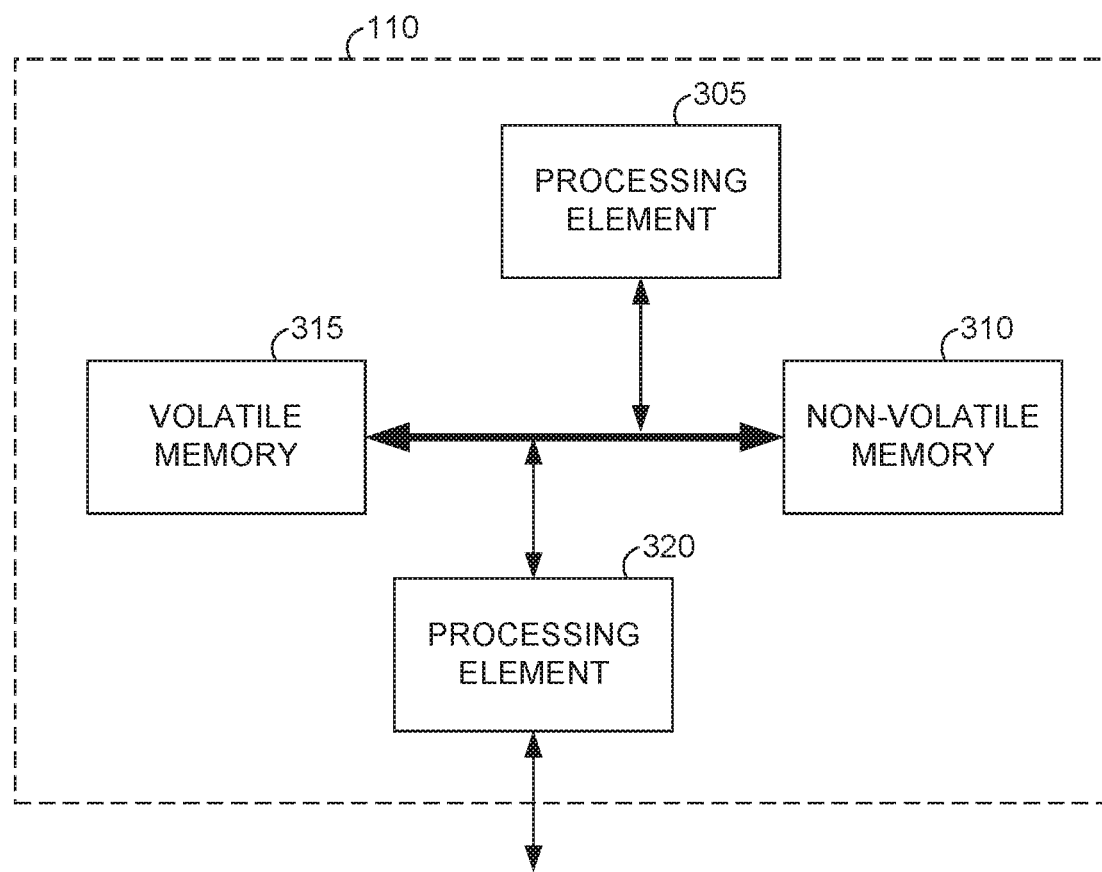
FIG. 3 is a schematic of a tracking computing entity in accordance with certain embodiments of the present disclosure.

FIG. 3 provides a schematic of a management computing entity 110 according to one embodiment of the present disclosure. In general, the terms computing entity, entity, device, system, and/or similar words used herein interchangeably may refer to, for example, one or more computers, computing entities, desktop computers, mobile phones, tablets, phablets, notebooks, laptops, distributed systems, gaming consoles (e.g., Xbox, Play Station, Wii), watches, glasses, beacons, key fobs, RFID tags, ear pieces, scanners, televisions, dongles, cameras, wristbands, wearable items/devices, items/devices, powered assets, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the management computing entity 110 may also include one or more communications interfaces 320 for communicating with various computing entities, such as by communicating data, content, information, and/or similar terms used herein interchangeably that can be transmitted, received, operated on, processed, displayed, stored, and/or the like. For instance, the management computing entity 110 may communicate with powered assets 100, mobile computing entities 105, badge-reader station computing entities 140, and/or the like.

As shown in FIG. 3, in one embodiment, the management computing entity 110 may include or be in communication with one or more processing elements 305 (also referred to as processors, processing circuitry, and/or similar terms used herein interchangeably) that communicate with other elements within the management computing entity 110 via a bus, for example. As will be understood, the processing element 305 may be embodied in a number of different ways. For example, the processing element 305 may be embodied as one or more complex programmable logic devices (CPLDs), microprocessors, multi-core processors, coprocessing entities, application-specific instruction-set processors (ASIPs), and/or controllers. Further, the processing element 305 may be embodied as one or more other processing devices or circuitry. The term circuitry may refer to an entirely hardware embodiment or a combination of hardware and computer program products. Thus, the processing element 305 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 305 may be configured for a particular use or configured to execute instructions stored in volatile or non-volatile media or otherwise accessible to the processing element 305. As such, whether configured by hardware or computer program products, or by a combination thereof, the processing element 305 may be capable of performing steps or operations according to embodiments of the present disclosure when configured accordingly.

In one embodiment, the management computing entity 110 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 310 as described above, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media may store databases, database instances, database management system entities, data, applications, programs, program modules, scripts, source code, object code, byte code, compiled code, interpreted code, machine code, executable instructions, and/or the like. The term database, database instance, database management system entity, and/or similar terms used herein interchangeably may refer to a structured collection of records or information/data that is stored in a computer-readable storage medium, such as via a relational database, hierarchical database, and/or network database.

In one embodiment, the management computing entity 110 may further include or be in communication with volatile media (also referred to as volatile storage, memory, memory storage, memory circuitry and/or similar terms used herein interchangeably). In one embodiment, the volatile storage or memory may also include one or more volatile storage or memory media 315 as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media may be used to store at least portions of the databases, database instances, database management system entities, data, applications, programs, program modules, scripts, source code, object code, byte code, compiled code, interpreted code, machine code, executable instructions, and/or the like being executed by, for example, the processing element 305. Thus, the databases, database instances, database management system entities, data, applications, programs, program modules, scripts, source code, object code, byte code, compiled code, interpreted code, machine code, executable instructions, and/or the like may be used to control certain aspects of the operation of the management computing entity 110 with the assistance of the processing element 305 and operating system.

As indicated, in one embodiment, the management computing entity 110 may also include one or more communications interfaces 320 for communicating with various computing entities, such as by communicating data, content, information, and/or similar terms used herein interchangeably that can be transmitted, received, operated on, processed, displayed, stored, and/or the like. For instance, the management computing entity 110 may communicate with computing entities or communication interfaces of the powered asset 100, mobile computing entities 105, and/or the like.

Such communication may be executed using a wired information/data transmission protocol, such as fiber distributed information/data interface (FDDI), digital subscriber line (DSL), Ethernet, asynchronous transfer mode (ATM), frame relay, information/data over cable service interface specification (DOCSIS), or any other wired transmission protocol. Similarly, the tracking computing entity 110 may be configured to communicate via wireless external communication networks using any of a variety of protocols, such as GPRS, UMTS, CDMA2000, 1xRTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol. Although not shown, the management computing entity 110 may include or be in communication with one or more input elements, such as a keyboard input, a mouse input, a touch screen/display input, audio input, pointing device input, joystick input, keypad input, and/or the like. The management computing entity 110 may also include or be in communication with one or more output elements (not shown), such as audio output, video output, screen/display output, motion output, movement output, and/or the like.

As will be appreciated, one or more of the management computing entity's 110 components may be located remotely from other management computing entity 110 components, such as in a distributed system. Furthermore, one or more of the components may be combined and additional components performing functions described herein may be included in the management computing entity 110. Thus, the management computing entity 110 can be adapted to accommodate a variety of needs and circumstances.

e. Exemplary Mobile Computing Entity

Figure 4:
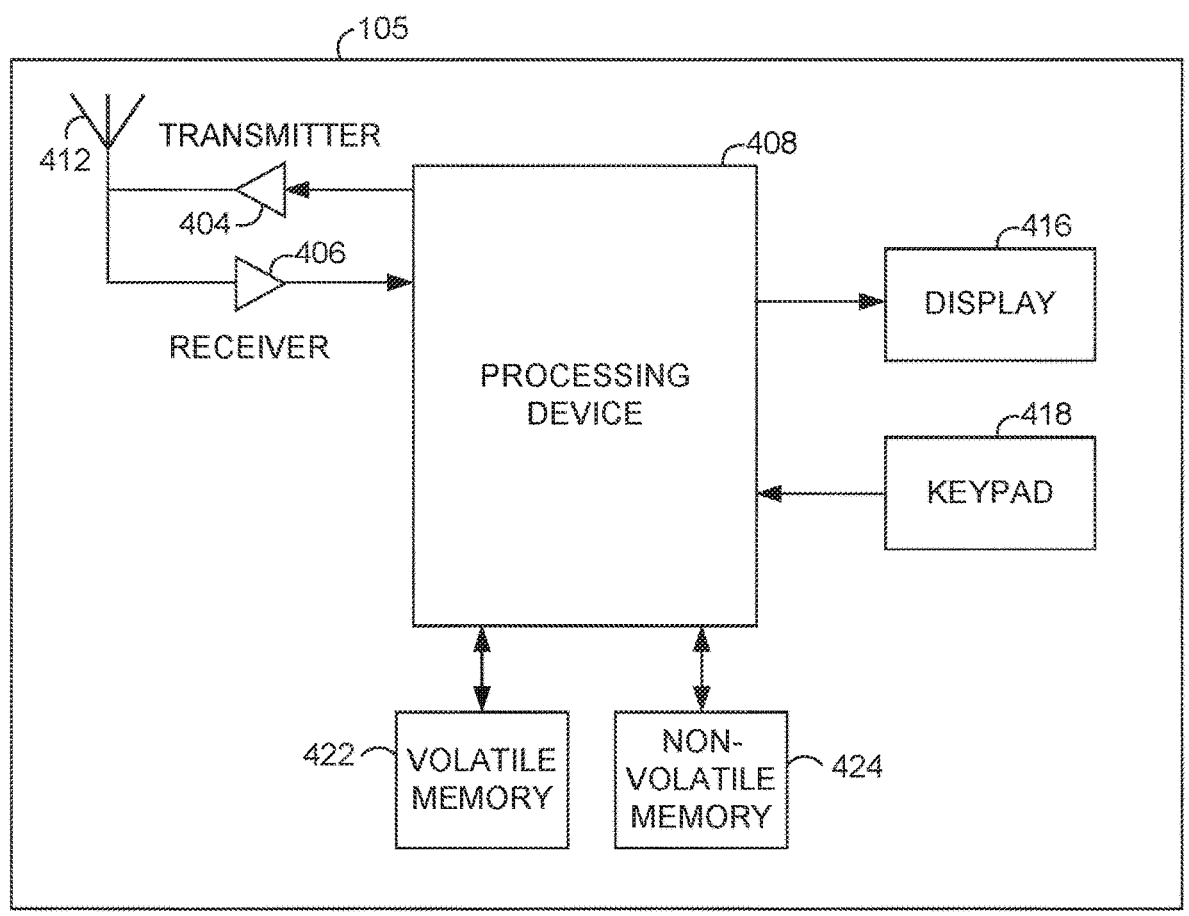
FIG. 4 is a schematic of a mobile computing entity in accordance with certain embodiments of the present disclosure.

FIG. 4 provides an illustrative schematic representative of a mobile computing entity 105 that can be used in conjunction with embodiments of the present disclosure. In one embodiment, a mobile computing entity may be carried for use by any employee, for example, a front line supervisor. In one embodiment, the mobile computing entities 105 may include one or more components that are functionally similar to those of the management computing entity 110 and/or as described below. As will be recognized, mobile computing entities 105 can be operated by various parties, including front line supervisors and other relevant personnel. As shown in FIG. 4, a mobile computing entity 105 can include an antenna 412, a transmitter 404 (e.g., radio), a receiver 406 (e.g., radio), and a processing element 408 that provides signals to and receives signals from the transmitter 404 and receiver 406, respectively.

The signals provided to and received from the transmitter 404 and the receiver 406, respectively, may include signaling information/data in accordance with an air interface standard of applicable wireless systems to communicate with various entities, such as powered assets 100, management computing entities 110, badge-reader station computing entities 140, and/or the like. In this regard, the mobile computing entity 105 may be capable of operating with one or more air interface standards, communication protocols, modulation types, and access types. More particularly, the mobile computing entity 105 may operate in accordance with any of a number of wireless communication standards and protocols. In a particular embodiment, the mobile computing entity 105 may operate in accordance with multiple wireless communication standards and protocols, such as GPRS, UMTS, CDMA2000, 1xRTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

Via these communication standards and protocols, the mobile computing entity 105 can communicate with various other entities using concepts such as Unstructured Supplementary Service information/data (USSD), Short Message Service (SMS), Multimedia Messaging Service (MMS), Dual-Tone Multi-Frequency Signaling (DTMF), and/or Subscriber Identity Module Dialer (SIM dialer). The mobile computing entity 105 can also download changes, add-ons, and updates, for instance, to its firmware, software (e.g., including executable instructions, applications, program modules), and operating system.

According to one embodiment, the mobile computing entity 105 may include location determining aspects, devices, modules, functionalities, and/or similar words used herein interchangeably. For example, the mobile computing entity 105 may include outdoor positioning aspects, such as a location module adapted to acquire, for example, latitude, longitude, altitude, geocode, course, direction, heading, speed, UTC, date, and/or various other information/data. In one embodiment, the location module can acquire data, sometimes known as ephemeris data, by identifying the number of satellites in view and the relative positions of those satellites. The satellites may be a variety of different satellites, including LEO satellite systems, DOD satellite systems, the European Union Galileo positioning systems, GLONASS, the Chinese Compass navigation systems, Indian Regional Navigational satellite systems, and/or the like. Additionally, the location module may be compatible with A-GPS for quick time to first fix and jump starting the ability of the location module to acquire location almanac and ephemeris data, and/or be compatible with SBAS such as WAAS, EGNOS, MSAS, and/or GAGN to increase GPS accuracy. Alternatively, the location information/data may be determined by triangulating the mobile computing entity's 105 position in connection with a variety of other systems, including cellular towers, Wi-Fi access points, and/or the like. Similarly, the mobile computing entity 105 may include indoor positioning aspects, such as a location module adapted to acquire, for example, latitude, longitude, altitude, geocode, course, direction, heading, speed, time, date, and/or various other information/data. Some of the indoor aspects may use various position or location technologies including RFID tags, indoor beacons or transmitters, Wi-Fi access points, cellular towers, nearby computing devices (e.g., smartphones, laptops) and/or the like. For instance, such technologies may include iBeacons, Gimbal proximity beacons, BLE receivers and/or transmitters, NFC receivers and/or transmitters, and/or the like. These indoor positioning aspects can be used in a variety of settings to determine the location of someone or something to within inches or centimeters.

The mobile computing entity 105 may also comprise a user interface (that can include a display 416 coupled to a processing element 408) and/or a user input interface (coupled to a processing element 408). For example, the user interface may be an application, browser, user interface, dashboard, webpage, and/or similar words used herein interchangeably executing on and/or accessible via the mobile computing entity 105 to interact with and/or cause display of information. The user input interface can comprise any of a number of devices allowing the mobile computing entity 105 to receive data, such as a keypad 418 (hard or soft), a touch display, voice/speech or motion interfaces, scanners, readers, or other input device. In embodiments including a keypad 418, the keypad 418 can include (or cause display of) the conventional numeric (0-9) and related keys (#, *), and other keys used for operating the mobile computing entity 105 and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the mobile computing entity can collect contextual information/data as part of the telematics data.

The mobile computing entity 105 can also include volatile storage or memory 422 and/or non-volatile storage or memory 424, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, data, applications, programs, program modules, scripts, source code, object code, byte code, compiled code, interpreted code, machine code, executable instructions, and/or the like to implement the functions of the mobile computing entity 105.

d. Exemplary Badge-Reader Station Computing Entity

In one embodiment, the badge-reader station computing entities 140 may each include one or more components that are functionally similar to those of the management computing entity 110 and/or the mobile computing entity 105. For example, in one embodiment, each of the badge-reader station computing entities 140 may include: (1) a processing element that communicates with other elements via a system interface or bus; (2) a user interface; (3) transitory and non-transitory memory; and (4) a communications interface. As previously noted, the badge-reader station computing entity 140 may comprise a user interface. For example, the user interface may be an application, browser, user interface, dashboard, webpage, and/or similar words used herein interchangeably executing on and/or accessible via the badge-reader station computing entity 140 to interact with the management computing entity 110 and/or the mobile computing entity 105, as described herein, and/or cause display of information/data. The user input interface can comprise any of a number of devices allowing the badge-reader station computing entities 140 to receive data, such as a keypad 418 (hard or soft), a touch display, voice/speech or motion interfaces, scanners, readers, or other input device. These architectures are provided for exemplary purposes only and are not limiting to the various embodiments.

In one embodiment, each badge-reader station computing entity 140 may include, be associated with, or be in wired or wireless communication with one or more card readers. As will be recognized, a card reader may take many forms. For instance, a card reader may be a BLE beacon, an RFID tag/sensor, an NFC device, a Wi-Fi device, a smart card reader, a proximity reader, a biometric reader, a bar code reader, a memory card reader, a wiegand card reader, a punched card reader, and/or the like. Via various communication standards and protocols, the card reader associated with the badge-reader station computing entity 140 can be communicated with, interrogated, read, and/or the like. For example, a badge 145 associated with an employee can communicate with the card reader associated with the badge-reader station computing entity 140 using contact approaches, for example, following the communication protocols defined in the ISO 7816 Standards, using contactless approaches, for example, following the communication protocols defined in the ISO 14443 and/or 15693 Standards, using biometric standards, or using multiple wireless communication standards and protocols, such as Bluetooth, Wibree, NFC, Wi-Fi, ZigBee, and/or any other wireless protocol or standard.

e. Exemplary Badge

Figure 5:
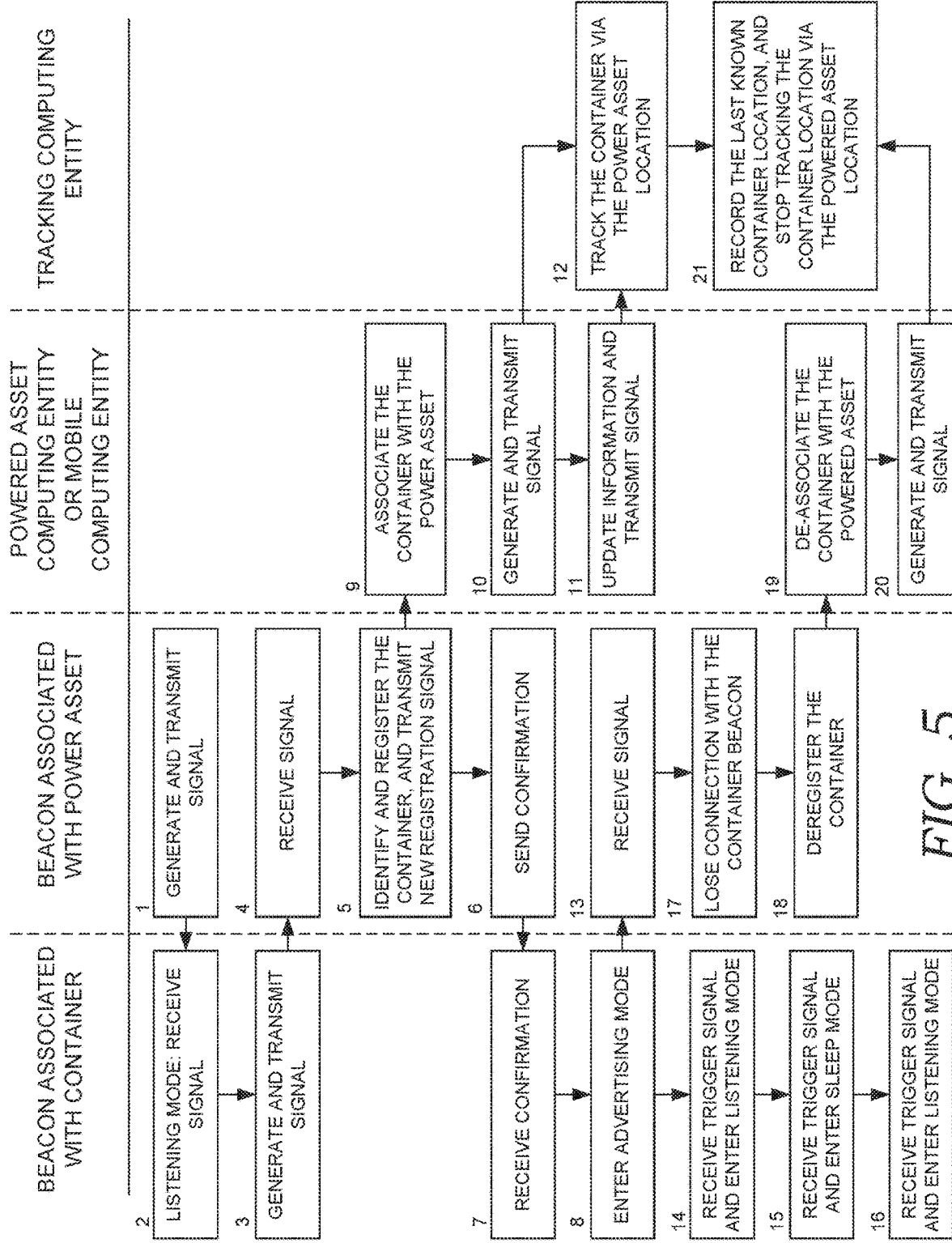
FIG. 5 is a sequence diagram illustrating operations and processes that can be used in connection with one or more beacon sensors, according to particular embodiments.

As will be recognized, a badge 145 associated with an employee may take many forms. For instance a badge may be a BLE beacon, and RFID tag/sensor, an NFC device, a Wi-Fi device, a CPU/MPU microprocessor multifunction card, a smart card, a proximity card, a biometric authentication, a barcode card, a memory card, a wiegand card, a punched card, a multi-mode communication card, and/or the like. The badge 145 can include some or all of the following components: one or more input interfaces for receiving information/data, one or more output interfaces for transmitting information/data, a processor, a clock, memory modules, one or more sensors for sensing and detecting various information/data, and a power source. In one embodiment, each badge 145 can store one or more unique identifiers, such as a GUID, a UUID, a character string, an alphanumeric string, text string, a barcode, and/or the like. The unique identifier may identify the associated employee. Via various communication standards and protocols, the badge 145 associated with the employee can be communicated with, interrogated, read, and/or the like. For example, the badge 145 associated with the employee can communicate with a card reader associated with a badge-reader station computing entity 140 using contact approaches, for example, following the communication protocols defined in the ISO 7816 Standards, using contactless approaches, for example, following the communication protocols defined in the ISO 14443 and/or 15693 Standards, using biometric standards, or using multiple wireless communication standards and protocols, such as Bluetooth, Wibree, NFC, Wi-Fi, ZigBee, and/or any other wireless protocol or standard. The badge 145 associated with the employee may also be in direct or indirect communication with a management computing entity 110, a mobile computing entity 105, and/or similar computing entities over the same or different communication protocols, wired or wireless networks f. Exemplary Sequence Operations Reference will now be made to FIG. 5 is a sequence diagram illustrating operations and processes that can be used in accordance with various embodiments of the present invention.

Brief Overview

Described herein are embodiments for a container tracking that allows tracking using beacons. Although FIG. 5 describes tracking containers and other particular items, it is understood that any item, disclosed herein can be tracked using the steps disclosed in FIG. 5, such as conveyor belt apparatuses, vehicles, the powered asset 100, the non-powered assets 103, etc. In various embodiments, some or each of the steps as described in FIG. 5 are utilized to obtain some or each of the data within some or each of the user interface views, as illustrated in FIG. 6A through FIG. 18, as described in more detail below.

With reference to FIG. 1, in one embodiment, a container beacon 155 associated with a container 107 can support enablement of an operational mode, which includes stopping the advertising or broadcasting operation of the container beacon 155 and keeping the container beacon 155 in the listening mode or the sleep mode as necessary (e.g., after being loaded onto a plane). After being unloaded from the plane or other vehicle, the container beacon 155 associated with the container 107 can receive a trigger signal to enable its advertising mode. The container beacon 155 can then transmit signals to a powered asset beacon 150 associated with a powered asset 100, for example, to enable location tracking using Bluetooth Low Energy Beacons for the corresponding container 107.

In one embodiment, before the asset loaded with the container 107 starts to move, a first operational mode of the container beacon 155 associated with the container 107 may be enabled. The following operations/steps describe an exemplary enablement of a first operational mode. The enablement may be achieved by setting the listening mode as the default operational mode of the container beacon 155 associated with the container 107. Thus, for instance, after losing connection with a powered asset beacon 150 (or some other entity), the container beacon 155 may automatically stop the advertising mode and enter into the listening mode. Alternatively, the container beacon 155 can receive a trigger signal to stop the advertising mode and enable the listening mode or sleep mode. The trigger signal can be transmitted from a device affixed to the asset, a device that is local to the corresponding asset location, or a device that is remotely located.

In one embodiment, the container beacon 155 may switch/change modes from the listening mode to the power-saving sleep mode upon detecting the occurrence of one or more configurable triggers/events. The configurable triggers/events may be a value, a change, and/or a rate of change, of pressure, altitude, motion, light, combinations thereof, and/or the like; a location; a sound, a time; a signal transmitted from another beacon (or other appropriate computing entity); a switch; a button; and/or the like. The configurable triggers/events may be preconfigured, determined adaptively by the container beacon 155 associated with the container 107, transmitted from another beacon, and/or the like. For example, the container beacon 155 can enter into the sleep mode upon detecting that the altitude of the plane loaded with the container 107 has reached a configurable threshold, upon detecting that the container beacon 155 is inside or outside of one or more configurable geo-fences, upon detecting a unique sound signature (e.g., via a sound sensor) indicating the engaging of floor latch securing hardware, upon detecting the presence of a group of beacons exceeding a configurable threshold, or after not having been moved for a configurable period of time. Alternatively, the container beacon 155 associated with the container 107 may switch/change from the listening mode to the sleep mode upon receiving a trigger signal transmitted from an appropriate computing entity.

In one embodiment, the container beacon 155 may switch/change modes from the sleep mode to the listening mode upon detecting the occurrence of one or more configurable triggers/events. The configurable triggers/events may be a value, a change, and/or a rate of change, of pressure, altitude, motion, light, combinations thereof, and/or the like; a location, a sound, a time; a signal transmitted from another beacon (or other appropriate computing entity); a switch; a button; and/or the like. As previously noted, the configurable triggers/events may be preconfigured, determined adaptively by the container beacon 155 associated with the container 107, transmitted from another beacon, and/or the like. For example, the container beacon 155 can enter into the listening mode upon detecting that the altitude or position of the plane or other vehicle loaded with the container 107 has reached a configurable threshold value, or determining a vehicle motion by detecting change of velocity, acceleration, altitude, combinations thereof, and/or the like. Alternatively, the container beacon 155 associated with the container 107 may switch/change from the sleep mode to the listening mode upon receiving a trigger signal transmitted from an appropriate computing entity.

In one embodiment, after being unloaded from a vehicle (e.g., the powered asset 100), the container beacon 155 may switch/change from the listening mode to the advertising mode upon detecting the occurrence of one or more configurable triggers/events. In another embodiment, the trigger signal may be a signal transmitted from a powered asset beacon 150 associated with a powered asset 100 (or any other computing entity, such as a device affixed to the plane).

In one embodiment, the container 107 is loaded to a non-powered asset 103 that is to be moved by a powered asset 100 (e.g., see FIG. 1). The container beacon 155 associated with the container 107 may receive a signal transmitted from a powered asset beacon 150 associated with the powered asset 100. The signal transmitted by the powered asset beacon 150 may include a unique identifier (e.g., GUID, UUID, and/or the like). The container beacon 155 may, upon verifying that the received identifier is one that it should respond to, generate and transmit a signal, which may include the unique identifier, received signal strength indicator (RSSI), and/or other information/data. The powered asset beacon 150 may, upon receiving the signal transmitted by the container beacon 155, identify and register the container 107 and transmit a confirmation signal. The container beacon 155 may then enter into the advertising mode.

In one embodiment, the powered asset beacon 150 (with which the container beacon 155 associated with the container 107 is registered) may transmit a signal to an appropriate computing entity (e.g., the mobile computing entity 105, a tracking computing entity) to associate the container 107 with the powered asset 100, and/or update the location of the container 107 as being the location of the powered asset 100 regularly, periodically, continuously, during certain time periods or time frames, upon determining the occurrence of one or more configurable triggers/events, in response to requests, in response to determinations/identifications, combinations thereof, and/or the like.

In one embodiment, the powered asset beacon 150 associated with the powered asset 100 may, upon detecting the connection/communication loss with the container beacon 155 associated with the container 107, deregister the container 107, and/or transmit a signal to the appropriate computing entity to de-associate the container 107 with the powered asset 100. The appropriate computing entity may record the last known container location and stop tracking the container 107 location via the powered asset's 100 location.

In one embodiment, the container beacon 155 associated with the container 107 may, upon detecting the connection/communication loss with the powered asset beacon 150 associated with the powered asset 100, switch/change to the listening mode. Alternatively, the container beacon 155 associated with the container 107 may maintain the advertising mode, upon detecting the connection/communication loss with the powered asset beacon 150 associated with the powered asset 100, until receiving other trigger signals. As will be recognized, a variety of approaches and techniques can be used to adapt to various needs and circumstances.

Operation/Step 1 of FIG. 5: Generate and Transmit Signal

In one embodiment, the process may begin with a powered asset beacon 150 associated with a powered asset 100 transmitting a signal for use by a container beacon 155 associated with a container 107. The powered asset beacon 150 may transmit the signal regularly, periodically, continuously, during certain time periods or time frames, on certain days, upon determining the occurrence of one or more configurable triggers/events, in response to requests, in response to determinations/identifications, combinations thereof, and/or the like. As previously noted, the signal transmitted by the powered asset beacon 150 may include one or more unique identifiers. The unique identifiers may identify the relevance of the powered asset beacon 150 (and corresponding powered asset 100) to the container beacons 155 within range. For instance, the signal may include a powered asset identifier and/or a powered asset beacon identifier (e.g., powered asset information/data).

As an alternative, the process may begin with an appropriate computing entity (e.g., an information/data collection device 130, a mobile computing entity 105, a powered asset computing entity, and/or the like) transmitting a signal for use by container beacons 155 within range. As yet another alternative, the process may begin with a device affixed to a plane, or a device that is local to the corresponding plane location, transmitting a signal for use by a container beacon 155 associated with a container 107 being unloaded from the plane. As will be recognized, a variety of other approaches and technique can be used to adapt to various needs and circumstances.

Operation/Step 2 of FIG. 5: Listening Mode: Receive Signal

In one embodiment, a container beacon 155 can have a preconfigured interest in powered asset beacon 150 signals of a particular class/type and/or appropriate computing entity signals of a particular class/type. The signals may include one or more unique identifiers that uniquely identify the corresponding powered asset 100 and/or powered asset beacon 150 (e.g., powered asset information/data). Using this approach, in listening mode, the container beacon 155 can ignore all powered asset beacon 150 signals and/or computing entity signals for which it is not registered. Similarly, the container beacon 155 can respond to a number of different types of powered asset beacon signals and/or computing entity signals.

Operations/Steps 3 and 4 of FIG. 5: Generate, Transmit and Receive Signal In one embodiment, after receiving a signal from a powered asset beacon 150 of a particular class/type (e.g., a powered asset beacon 150 for which the container beacon 155 has a preconfigured interest), the container beacon 155 may generate and transmit a signal for the powered asset beacon 150 to detect and process. The signal from the container beacon 155 may include the powered asset's unique identifier, the powered asset beacon's unique identifier, the container's unique identifier, the container beacon's unique identifier, RSSI, and/or other information/data. In one embodiment, the container's information/data (e.g., unique container identifier and/or unique container beacon identifier) may identify relevance of the container beacon 155 to the powered asset beacon 150 (and/or the appropriate computing entity). In one embodiment, RSSI may be included in the signal to estimate/approximate the distance between the container beacon 155 and the powered asset beacon 150 (or the appropriate computing entity). Thus, the powered asset beacon 150 may receive the signal transmitted from the container beacon 155 with the container information/data.

Operation/Step 5 of FIG. 5: Identify and Register the Container, and/or Transmit New Registration In one embodiment, after receiving the signal in operation/step 4, the powered asset beacon 150 may register the container 107 using the container's information/data (e.g., unique container identifier and/or unique container beacon identifier) transmitted by the container beacon 155. In one embodiment, the powered asset beacon 150 (or other computing entity) may further transmit the new container registration signal to an appropriate computing entity to initiate the process of associating the container 107 with the powered asset 100, such as to a tracking computing entity 105. The transmitted registration signal may include the container information/data, the powered asset information/data, and/or the like. The communication between the powered asset beacon 150 and the appropriate computing entity may be executed using a wired connection, for example, a bus, a wired PAN, or the like, or via wireless communication networks, for example, a wireless PAN, LAN, MAN, WAN, or the like. As an alternative embodiment, the function of associating the container 107 with the powered asset 100 may be executed by the powered asset beacon 150.

Operations/Steps 6, 7, and 8 of FIG. 5: Send and Receive Confirmation, and Enter Advertising Mode In one embodiment, the powered asset beacon 150 (or other appropriate computing entity) may send a confirmation signal to the container beacon 155 to inform the container beacon 155 of a positive identification and registration of the corresponding container 107. Responsive to receiving the confirmation signal, the container beacon 155 may enter advertising mode. In advertising mode, the container beacon 155 may regularly, periodically, and/or continuously transmit an advertising signal for use by the powered asset beacon 150 and/or the appropriate computing entity to track its location. To do so, the advertising signal may include the container information/data (e.g., unique container identifier and/or unique container beacon identifier), RSSI, and/or other information/data.

In one embodiment, if the container beacon 155 associated with the container 107 determines/detects that it is no longer in communication with the powered asset beacon 150, the container beacon 155 may switch/change from the advertising mode to the listening mode. Similarly, if the container beacon 155 determines/detects that it is still in communication with the powered asset beacon 150, the container beacon 155may continue advertising in advertising mode.

Operations/Steps 9, 10, 11, and 12 of FIG. 5: Associate and Track Container with Powered Asset In one embodiment, the mobile computing entity 105 (or other appropriate computing entity) may associate the container 107 with the powered asset 100 upon receiving the container 107 registration signals from the powered asset beacon 150. In one embodiment, to track the container 107, the mobile computing entity 105 may generate and transmit signals to the tracking computing entity 110 to initiate the process of tracking the container 107 and/or update the location of the container 107 as being the location of the corresponding powered asset 100. The transmitted signal may include the powered asset information, container information/data of the newly registered container 107, a timestamp for initiating the association of the container 107 with the powered asset 100, and location information/data of the powered asset 100. The location information/data of the powered asset 100 (and thereby the container 107) may be identified/determined using GPS technologies by acquiring, for example, latitude, longitude, altitude, and/or geocode data corresponding to workers/users. Additionally or alternatively, the location information/data may be collected and provided via triangulation of various communication points (e.g., cellular towers, Wi-Fi access points, etc.) positioned at locations throughout a geographic area. Such embodiments allow the location and/or movement of powered assets 100 and associated containers 107 to be monitored and tracked. As will be recognized, a variety of other approaches and techniques can be used to adapt to various needs and circumstances. The location of each of these can be updated and stored in a tracking database, for example, by the tracking computing entity 110. The location of the powered assets 100 and containers 107 can be monitored, tracked, and updated regularly, periodically, continuously, upon determining the occurrence of one or more configurable triggers/events, and/or the like.

Operation/Step 13 of FIG. 5: Receive Signal

In one embodiment, the powered asset beacon 150 may receive a signal transmitted by a container beacon 155 in advertising mode to confirm that the container beacon 155 is within communication range and has normal connection with the powered asset beacon 150. This validates the continuing association of the container 107 with the powered asset 100, which indicates no action is needed to de-associate the container 107 with the powered asset 100. And as noted, the location of the powered assets 100 and containers 107 can be updated regularly, periodically, continuously, upon determining the occurrence of one or more configurable triggers/events, and/or the like. As will be recognized, these steps/operations can be performed by a variety of computing entities.

Operation/Step 14 of FIG. 5: Receive Trigger Signal and/or Enter Listening Mode

In one embodiment, a container beacon 155 may switch/change to the listening mode from the advertising mode upon determining the occurrence of one or more configurable triggers/events. As previously described, the configurable triggers/events may be a value, a change, and/or a rate of change, of pressure, altitude, motion, light, combinations thereof, and/or the like; a location, a sound, a time; a signal transmitted from another beacon (or other appropriate computing entity; a switch; a button; and/or the like. The configurable triggers/events may be preconfigured, determined adaptively by the container beacon 155 associated with the container 107, transmitted from another beacon, and/or the like. For example, in one embodiment, the container beacon 155 may, while in the advertising mode, enable the listening mode during certain time periods or time frames to detect if the container beacon 155 is in normal communication with a powered asset beacon 150 associated with a powered asset 100 (and/or another appropriate computing entity). The container beacon 155 may switch/change into the listening mode, and stop advertising if necessary, upon detecting that the container beacon 155 is no longer in communication with the powered asset beacon 150 (and/or another appropriate computing entity). Alternatively, the container beacon 155 may switch/change into the listening mode and stop advertising upon receiving a trigger signal transmitted from a device (or other appropriate computing entity) affixed to a vehicle, local to the corresponding vehicle location, or remotely located.

Operations/Steps 15 and 16 of FIG. 5: Receive Trigger Signal and/or Change Mode

In one embodiment, a container beacon 155 may switch/change from the listening mode to the sleep mode to save energy upon determining the occurrence of one or more configurable triggers/events. In an alternative embodiment, a container beacon 155 may switch/change directly from the advertising mode to the sleep mode to save energy upon determining the occurrence of one or more configurable triggers/events. For example, in one embodiment, the container beacon 155 may switch/change from the listening mode to the sleep mode upon detecting that a plane (in which the container 107 is loaded) has reached a configurable altitude and/or detecting a predefined motion event. Alternatively, the container beacon 155 may enter into the sleep mode upon detecting that, for a configurable period of time, the container 107 has not been moved and/or the container beacon 155 has not been in communication with a powered asset beacon 150 for a configurable period of time. As will be recognized, a variety of other approaches and techniques can be used to adapt to various needs and circumstances.

Similarly, the container beacon 155 may switch/change from the sleep mode to the listening mode upon determining the occurrence of one or more configurable triggers/events. For example, in one embodiment, the container beacon 155 may switch/change from the sleep mode to the listening mode upon detecting a plane/vehicle, in which the container 107 is loaded, reaches a configurable altitude (e.g., ground level) and/or detecting a predefined motion event. Alternatively, the container beacon 155 may enter into the listening mode upon receiving a trigger signal transmitted from a device (or other appropriate computing entity) affixed to a plane, local to the corresponding plane location, or remotely located.

Operations/Steps 17 and 18 of FIG. 5: Lose Connection and Deregister Container

In one embodiment, a powered asset beacon 150 may detect the connection/communication loss with a container beacon 155 with which it is registered. In response, the powered asset beacon 150 (or other appropriate computing entity) may initiate the process to deregister the container 107 from the corresponding powered asset 100. Alternatively, a powered asset beacon 150 (or other appropriate computing entity) may generate and transmit request signals to a registered container beacon 155 upon detecting the connection/communication loss with the container beacon 155. The request signals may include triggers for the container beacon 155 to (a) switch/change to the advertising mode from the listening mode and/or the sleep mode and/or (b) request advertising signals from the container beacon 155. If the powered asset beacon 150 (or other appropriate computing entity) does not receive response from the container beacon 155 after one or multiple attempts to establish the connection, the powered asset beacon 150 (or other appropriate computing entity) may confirm the loss of connection with the container beacon 155 and/or initiate the process to deregister the container 107 accordingly.

After deregistering a container 107, the powered asset beacon 150 (or other appropriate computing entity) may transmit a request to de-associate the container 107 with the powered asset 100. In one embodiment, the request to de-associate the container 107 may include a timestamp with location information/data for the last normal communication between the container beacon 155 and the powered asset beacon 150 (or other appropriate computing entity).

Operations/Steps 19, 20, and 21 of FIG. 5: De-Associate the Container with the Powered Asset In one embodiment, responsive to an appropriate request, a container 107 may be de-associated with the powered asset 100 with which the container 107 was previously associated. In one embodiment, the de-association may include transmitting a request to tracking computing entity 110 to stop updating the container's 107 location as being the location of the previously associated powered asset 100. Correspondingly, the tracking computing entity 110 may record the last known container 107 location in the tracking database as being the location for the last normal communication between the container beacon 155 and the powered asset beacon 150 (or other appropriate computing entity). The appropriate computing entity records this location as the container 107 location until a new valid update signal is received for the container. For instance, the new update signal may be a request to initiate location tracking of the container 107 via a powered asset 100 (or other appropriate computing entity), a signal informing that the container 107 is loaded onto a plane or moved into a warehouse, a scan or other reading of the container information/data at one or more points in the carrier's transportation and logistics network, and/or the like. In various embodiments, some or each of the steps of FIG. 5 are employed to provide some or each of the data within particular views as illustrated in FIGS. 6A through 20. For example, the beacons may be used to help infer whether a particular task is completed, as described in more detail below. Although reference is made in FIG. 5 to particular items (e.g., asset 100, container 103) for which the beacons may function on or with, it is understood that this is illustrative only and that beacons can be attached and function on any suitable apparatus or surface described herein, such as conveyor belt apparatuses, shepherd's hooks, and/or other tools.

g. Exemplary Operations Management System

Existing user interface and software technologies for managing tasks or work operations are static in that they provide non-intuitive or complicated user interfaces for navigation, provide limited views of important information, and provide non-real-time access to relevant data. For example, particular existing user interface technologies include views that fail to clearly identify: each worker, each task that is associated with that worker, and a status indicator indicating whether the task has been performed yet. Certain existing user interface technologies also require users to drill down several layers to obtain relevant information. This may make it arduous and slower for a user to navigate through the user interface to obtain relevant information. Consequently, using these interfaces may be costly for users who oversee operations that are associated with important deadlines. Further, some user interfaces have limited views of information regarding one or more task operations, such as only including views that passively show if an individual has completed some task. However, other views or data may be relevant in managing one or more tasks. In another example, typical user interfaces and software technologies may indicate whether some task has been completed based on manual user input, which may be entered well after the task has been completed and a problem has arisen. Accordingly, these existing technologies fail to provide real-time monitoring and analysis through various sensors to show that a task has been completed.

At least some embodiments of the present disclosure therefore improve these existing user interface and other software technologies and the efficiency of using electronic devices by at least providing an intuitive and navigable user interface with various views that provide the following non-conventional features: status indicators indicating whether a task has been completed by a particular time, identifiers indicating whether a group (e.g., a set) of workers have completed a task based on receiving information from one or more sensors, and/or effectiveness scores based on individual task scores, which is described in more detail below.

In an example illustration of some technological improvements over existing user interfaces, some embodiments of the present disclosure include views (e.g., a main menu) that are intuitive and easily navigable in that they clearly list or identify each worker or individual and the task associated with such individual (e.g., FIG. 6A, FIG. 11). This may increase a user's navigation speed, such as a supervisor who needs to quickly view one or more status indicators to determine whether a group of workers that she oversees will meet a target date for various identified tasks. Some embodiments of the present disclosure also increase user navigation speed by allowing data to be accessed directly from the main menu, such as hovering a pointer over a name to see a task, as opposed to drilling down several layers before a supervisor sees the task associated with the worker.

Some embodiments of the present disclosure also improve existing user interface technologies by including additional views of important information, such as some or all of the views as described in FIG. 6A through FIG. 18. Certain embodiments of the present disclosure also improve existing user interface and software technologies by providing real-time or near-real-time access to important information. For example, when a problem arises with one or more operations processes, such as when a conveyer belt stops functioning, this can affect when these operations processes finish. Accordingly, some embodiments of the present disclosure provide real-time monitoring, via one or more sensors, indicating an important event has occurred, such as a malfunction of a conveyor belt, and in response to the detection of such event, a supervisor can be notified through the intelligent user interface and corrective action can be taken.

Referring to FIG. 6A, a view 600 or screenshot of a user interface is schematically depicted. The various views (e.g., view 600) of the present disclosure can be provided in any suitable manner. For example, in some embodiments, a user can open a client application, such as a web browser, and input a particular Uniform Resource Locator (URL) corresponding to a particular website or portal. In response to receiving the user's URL request, an entity, such as the management computing entity 110 may provide or cause to be displayed to a user device (e.g., a mobile computing entity 105), the view 600 represented by FIG. 6A. A "portal" as described herein in some embodiments includes a feature to prompt authentication and/or authorization information (e.g., a username and/or passphrase) such that only particular users (e.g., a corporate group entity) are allowed access to information. A portal can also include user member settings and/or permissions and interactive functionality with other user members of the portal, such as instant chat. In some embodiments a portal is not necessary to provide the user interface, but rather any of the views can be provided via a public website such that no login is required (e.g., authentication and/or authorization information) and anyone can view the information. In yet other embodiments, the views represent an aspect of a locally stored application, such that a computing device hosts the entire application and consequently the computing device does not have to communicate with other devices (e.g., the management computing entity 110) to retrieve data.

The field 607 of the view 600 prompts a user to "click on an item on the left to get started." Accordingly, responsive to a user selecting the button 603, 605, and/or any identifier or symbol in the group of names 602, the associated information is displayed. For example, in some embodiments in response to a user selection of the button 603 ("people"), the list of names 602 is provided in order to display identifiers that identify group of workers or individuals that Sally Supervisor manages, as indicated in the indicia 601. User selections may occur in any suitable manner for any of the user interface views describe herein. For example, a user can use a hand gesture, and/or an interface pointer to click (or hover over) a character set or identifier (e.g., "P. Bunyan", "People," etc.) to obtain more information concerning the identifier, such as the information displayed in any of the views of FIGS. 6A-18. In this way, user navigation speed can be increased via this user interface without having to navigate through several screens or layers. It is understood that although the various views described in the present disclosure makes reference to particular identifiers, such as names (e.g., P. Bunyan) and values (e.g., time-card values), any suitable identifier or value may be suitable. Accordingly, the identifiers and values described herein are representative only.

In some embodiments, in response to a selection of the activities button 605, each task one or more individuals within the group of names 602 must complete is displayed. The calendaring feature 608 allows a user to select which date to monitor. For example, in response to a user selection of the calendaring feature 608, the user may select a particular month, day, and year to see that day's tasks that are due and the person responsible for completing those tasks. Additionally or alternatively, a user may obtain other views that show the monthly, yearly, and/or other time period due dates for tasks as opposed to only daily tasks. For example, a range of tasks that are due for an entire month may be displayed. Although view 600 and various views of the present disclosure describe specific user interface features, such as a button, it is understood that any feature can be used alternatively or additionally than the features illustrated or described. A "feature" within a user interface view as described herein is or includes one or more: buttons, checkboxes, dropdown lists, list boxes, fields, icons, tabs, identifiers, and/or any other suitable user interface components.

In response to a selection of the icon 606 or identical icons in the view 600, a corresponding person's (e.g., P. Bunyan) tasks are displayed. In response to a selection of the icon 608 or identical icons in the view 600, a corresponding person's schedule and/or timecard is displayed (e.g., a clock-time of when the person clocked in/out at work for beginning or end of work shift and/or breaks). In response to a selection of the icon 610 or identical icons in the view 600, more detailed information is displayed about a person, such as a combination of a timecard, tasks, status indicators, written notes, reminders, etc.

FIG. 6B schematically depicts the view 600-1 of an operations management system user interface, according to certain embodiments. In some embodiments, the view 600-1 represents the view 600 at a second subsequent time. For example, the view 600-1 can be displayed in response to a user selection of the entry 609 corresponding to the name "P. Bunyan" after the selection of the button 603 of the view 600 is made. In some embodiments, the view 600-1 is displayed in response to the user selection of the icons 606, 608, and/or 610 of FIG. 6A.

FIG. 6B illustrates various activities and tasks that are associated with the person "P. Bunyan." For example, tasks associated with the buttons 611, 613, 615, 617, 619, and 621 can be displayed in response to selecting an arrow feature of each button. A selection of the "Job Hazard Analysis" button 611 causes the user interface to display information indicating whether P. Bunyan is properly performing a job task such that there are no apparent hazards. A selection of the "Discussion" button 613 in some embodiments causes the user interface to display various manually-entered notes, such as promotions, conversations, or other important notes associated with P. Bunyan. A selection of the "Pre Conveyor Securing" button 615 in some embodiments causes the user interface to display information indicating whether P. Bunyan has been assigned to conveyor belt mechanisms that need to be prepared for operation (or fixed). A selection of the "Walk Off" button 617 can cause the user interface to display a checklist of tasks that need to be performed before leaving a work site, such as "Inspect ULD's," "equipment stored properly," "chutes" that are in place, "salt performed." In these embodiments, a field can be displayed (not shown) next to each task and a status indicator (e.g., a checkmark) indicating whether or not the person (e.g., P. Bunyan) has completed that task for the corresponding date. A selection of the "post conveyor securing" button 619 can also cause the user interface to display a checklist of items a user must perform in order to get a conveyor belt up and functioning. In these embodiments, a field can be displayed (not shown) next to each task and a status indicator (e.g., a checkmark) indicating whether or not the person (e.g., P. Bunyan) has completed that conveyor belt task for the corresponding date. A selection of the "Unvalidated Timecard" button 621 in some embodiments causes the user interface to display indications of when a person has clocked in/out, etc.

FIG. 7A schematically depicts a particular view 700 of an operations management system user interface, according to certain embodiments. In some embodiments, the view 700 is displayed in response to a user selection of the "Job Hazard Analysis" button 611 of FIG. 6B. The view 700 indicates whether a worker, P. Bunyan, has or is meeting biomechanics criteria while performing one or more tasks. Biomechanics criteria, in some embodiments, includes a set a rules for ensuring that a worker's mechanics for physical tasks are correct and/or whether some biomechanical event has occurred. For example, the biomechanics criteria can include criteria for determining whether the worker correctly lifts or lowers one or more parcels, criteria for determining whether the worker has fallen or slipped, and/or criteria for determining whether a worker has been hit by an object or has run into an object. In some embodiments, a selection of the "Lifting Lowering" button 725 causes the indicators 731, 733 and other identical indicators to be displayed. In these embodiments, it can be determined whether a particular worker is bending at the knees correctly for loading parcels, is loading the parcels below shoulder height, and uses a load stand where appropriate.

In various embodiments, determining whether a worker has met biomechanics criteria and/or has performed various tasks as disclosed herein is based at least in part on inferring, via one or more sensors, whether the worker has completed such tasks and/or met biomechanics criteria. For example, in order to determine whether a worker "bends at knees," a camera (e.g., the mobile entity 105 of FIG. 1) employing object recognition algorithms is utilized in some embodiments. Accordingly, feature recognition algorithms that detects the knees of a person and whether they bend can be sensed and transmitted to the management entity 110 and/or a mobile device 105. In response to the detection by the object recognition algorithm, some or each of the scores 731 and/or 733 are displayed to the view 700 in some embodiments. The score 731 in embodiments indicates a quantity of times a person has not bended at his/her knees, such as bending at the waist. The score 733 in embodiments indicates a quantity of times a person has bended at his/her knees. The view 700 indicates that the person has bended her knees half of the time and has not bended her knees half of the time.

In some embodiments, inferring whether a person loads "below shoulder height" is also performed by one or more sensors, such as an object recognition camera. The view 700 indicates that the worker P. Bunyan has correctly loaded parcels each time a parcel has been loaded. In some embodiments, inferring whether a person "uses a load stand" is also performed by one or more sensors, such as a beacon sensor, accelerometer, gyroscope, tag, and/or other sensor attached to the load stand. For example, any of the processes described in FIG. 1 and/or FIG. 5 in connection with the powered/non-powered assets may be utilized. A load stand (e.g., a non-powered asset) is a platform that a worker may use when parcels need to be placed above shoulder height. In an example illustration, the load stand can include a proximity tag (e.g., an RFID tag) and when a proximity reader (e.g., a RFID reader within a mobile device located on a worker) is within a threshold distance or signal strength of the proximity tag, it may be inferred that the worker has used or is using a load stand. In these embodiments, in response to the signal strength threshold between the two devices are met, the indication can be sent to the management entity 110 and/or a device displaying the view 700, which causes the incrementing of the quantity of times a user uses the load stand within the view 700 and its associated display functions. Alternatively or additionally, in response to a gyroscope and/or accelerometer attached to a load stand moving outside of a particular threshold, it can also be inferred that the load stand is being used by a person, as the moving of the load stand outside of some movement threshold may correspond to a user picking up the load stand, which was otherwise sitting still in a storage area. In yet other embodiments, alternatively or additionally, beacons are used, such as those described by the container beacons 155, and/or the beacons 150 of FIG. 1. In these embodiments, beacons attached to the load stand are configured to broadcast location identifiers to listening devices (e.g., a mobile device of P. Bunyan) that are within a particular broadcast receiving threshold. Accordingly, when the listening device obtains the identifiers, it can then transmit the identifiers to the management entity 110 and/or a device displaying the view 700, causing the view 700 to score and/or display that a load stand is or has been used.

It is understood that although specific sensors and units of equipment (e.g., load stand) have been discussed, any suitable sensors located on any suitable unit of equipment (e.g., conveyor belt, hammers, drills, fork lift, etc.) may be used to help formulate data within some or each of the various views described herein. For example, suitable sensors include: beacons that include Bluetooth® Low Energy (BLE) tags/readers, Radio-frequency Identification (RFID) tags/readers, Near Field Communication (NFC) tags/readers, accelerometers (e.g., for determining whether a parcel/equipment is being utilized), gyroscopes, microphones (e.g., to perform speech recognition to identify through user's words whether he/she completed a task), temperature sensors, object recognition cameras, load or weight sensors (e.g., to determine whether a loading vehicle is full), sonar sensors, range finder sensors, tactile sensors (e.g., whiskers, bump sensors, touch sensitive skin, etc.) (e.g., to determine whether a user has picked up a parcel/unit of equipment), stereo vision sensors, a Universal Product Code (UPC), Quick Response Code (QRC), or other barcode tag/reader, etc. Some or each of these sensors can be utilized to infer whether an individual has engaged in or completed one or more tasks. The sensor readings can be transmitted to the view 700 and/or any of the views described herein.

In some embodiments, in response to the selection of the button 727, information is displayed indicating whether the worker has been hit by an object or has run into an object. This information can be inferred from sensors, such as bump panels or other motion sensors located within a wearable article on an individual and/or on a unit of equipment. For example, it can be inferred whether a package has fallen off of a shelf and struck P. Bunyan based on a load sensor suddenly changing a load along with parallel actions of an accelerometer located on the box moving outside of a threshold and an accelerometer located on a wearable device of a user spiking outside of some threshold. In response to the selection of the button 729, it is inferred whether P. Bunyan has fallen or slipped. As described above, this inference can be made through any suitable set of sensors, such as accelerometers, located on a user's wearable device that suddenly spikes. The sudden spike may correspond to the fall itself or impact of the fall. Although the present disclosure describes one or more sensors that can infer whether one or more tasks have been completed it is understood that, alternatively or additionally, the data input within any of the views can be in response to a user inputting one or more values within the views in response to manually observing and determining whether the user has completed a task. For example, for determining whether a worker "bends at knees," a user supervisor can manually make this determination after physically observing a worker and inputting the indication associated with the view 700. It is also understood that whenever various detections or inferences are made by one or more sensors as described above, associated notifications can be transmitted (e.g., to the mobile entity 105/management entity 110) indicating such detection or inference. In this way, users, such as supervisors, may see, in near-real-time, whether some event has occurred and/or task has been completed. For example, as soon as a sensor detects a fall by a worker, this information can be related to the management entity 110 and the management entity 110 can responsively notify a supervisor's mobile computing entity 105, which includes one or more of the various views described herein, which causes the device to display the notifications, such as via various status indicators. A "status indicator" as described herein includes one or more symbols (e.g., an icon), identifiers, and/or flags that indicates whether user attention is needed for a particular set of information and/or whether data associated with one or more task operations have fallen outside of some threshold FIG. 7B schematically depicts a particular view 700-1 of an operations management system user interface, according to certain embodiments. In some embodiments, the view 700-1 is displayed in response to the user selection of the icon 735 of the view 700. Accordingly, when a user selects the icon 735, the display box 737 is displayed, which includes two fields configured to receive user input of "additional comments" and "employee signature." In some embodiments, the "additional comments" field allows a supervisor to manually input comments that can be read by the associated workers and/or other management members. For example, a supervisor user can input the phrase "Good job today at bending knees. Next time bend a little lower to use more of your legs and less of your back." The "employee signature" field may be configured to receive worker or employee signatures to verify that he/she has read the comments.

In some embodiments, the scoring of whether an individual meets the biomechanics criteria occurs in response to a natural language processing (NLP) module that reads the passages within the "additional comments" field. NLP is a technique configured to analyze semantic and syntactic content of the unstructured data of a set of data. In certain embodiments, the natural language processing technique may be a software tool, widget, or other program configured to determine meaning behind the unstructured data. More particularly, the natural language processing technique can be configured to parse a semantic feature and a syntactic feature of the unstructured data. The natural language processing technique can be configured to recognize keywords, contextual information, and metadata tags associated with one or more portions of the set of data. In certain embodiments, the natural language processing technique can be configured to analyze summary information, keywords, figure captions, or text descriptions included in the set of data, and use syntactic and semantic elements present in this information to identify information used for dynamic user interfaces. The syntactic and semantic elements can include information such as word frequency, word meanings, text font, italics, hyperlinks, proper names, noun phrases, parts-of-speech, and/or the context of surrounding words. Other syntactic and semantic elements are also possible. Based on the analyzed metadata, contextual information, syntactic and semantic elements, and other data, the natural language processing technique can be configured to make recommendations for the scores within the view 700.

As an example, the natural language processing technique may identify words associated with one or more emotions (e.g., the word "glad" may be associated with "happiness," the word "uncertain" may be associated with "confused," or vice versa), analyze the semantic and syntactic usage and context of the words, and determine one or more sentiment features or scores. In some examples, the NLP technique can determine whether one or more tasks were completed based on the comments. For instance, in certain embodiments, the natural language processing may parse unstructured data of the set of data in the form of a user comment stating "Good job today at bending knees. Next time bend a little lower to use more of your legs and less of your back" to identify that the worker bended his/her knees today and responsively increment the feature 733 from a "1" to a "2."

FIG. 8A schematically depicts a particular view 800 of an operations management system user interface, according to certain embodiments. In some embodiments, the view 800 is displayed in response to a selection of the "Pre Conveyor Securing" button 615 of FIG. 6B. The "Pre Conveyor Securing" feature 803 describes whether one or more workers have correctly secured a conveyor belt apparatus. A conveyor belt apparatus is a machine that includes a conveyor belt configured to rotate thereby moving objects, such as parcels, from one point to another. The Conveyor belt may be or include a continuous belt, chain, or rollers. The field 806 indicates that there are a total quantity of 5 conveyors and each of the conveyor belt apparatuses have been secured correctly, as indicated by the status indicator 805.

FIG. 8B schematically depicts a particular view 800-1 of an operations management system user interface, according to certain embodiments. FIG. 8B illustrates the situation in which one or more conveyor belt apparatuses are not in operation. The field 807 indicates that there are a total quantity of 5 conveyors, but 2 conveyors have problems or are otherwise are not in operation, as indicated in the field 809. Determining whether conveyors are not in operation can occur via any suitable manner, such as through one or more sensors. For example, a conveyor belt apparatus can include an accelerometer within the belt feature, and when the conveyor belt apparatus fails or stops, it causes the accelerometer to stop, which may trigger a notification to the management entity 110 and/or a mobile device 105, which includes the view 800-1. This may cause the field 809 to be populated. Any of the sensors described above with respect to FIG. 1 and FIG. 5 can also be used to determine whether a conveyor belt apparatus is not in operation.

The field 811 indicates that there are a total quantity of 1 platform needed and the field 813 indicates that there are a total quantity of 1 shepherd hooks needed. These fields specify an indication of a type of tool needed and quantity of tools needed to secure/start (or fix) the conveyors in operation. A "platform" is a ladder or other elevated apparatus that is used to remove or obtain objects off of high conveyor belt apparatuses. For example, a parcel may become stuck in a high conveyor and in order to feed it back onto the belt, a platform may be needed to reach it and secure it again back on a belt of the conveyer. Determining whether a platform is needed may occur via any suitable sensor, such as an object recognition camera, a motion sensor attached to the conveyor coupled with a memory, and/or any operations illustrated in FIG. 1 or FIG. 5. For example, in order for a system, such as the management entity 110 to determine how high the conveyor is such that a platform is needed, when the conveyor stops, it may transmit both a notification that it has stopped, along with its ID, such that the management entity 110 can perform a lookup operation (e.g., in a database) to associate the ID with a particular height such that a determination of whether a platform is needed can be made and populated in the field 811. In various embodiments, this determination is made via "post conveyor securing" as indicated in the button 619. A "shepherd hook" is also a tool that is used by individuals to harness or remove objects off of conveyors that are relatively high. In some instances, conveyor belt apparatuses may be higher off the ground but not so high that a platform is needed, but rather is low enough for a shepherd hook to be used. Any sensors methods can be used to determine whether a shepherd hook is needed, such as any of the methods described above with respect to how a platform is determined to be needed. In various embodiments, determining whether a shepherd hook is needed is also made via "post conveyor securing" as indicated in the button 619.

The "problem 1" and "problem 2" entries 815 and 817 correspond to a checklist of items that need to be done before securing and/or fixing the conveyors that are "problem conveyors." For example, a placard or public notice sign may need to be placed at a sign before the conveyor is secured or a shepherd hook may need to be placed at the particular site before the conveyor begins operation. The field 821 indicates the location of the "1" platform needed. This location may be determined by one or more sensors on the platform, such as location sensors (e.g., the beacon 150, 107, location sensors 120), telematics sensors (e.g., the sensors 125), and/or any sensors described in FIG. 1 and FIG. 5. The field 823 indicates the location of the "1" shepherd hook needed, which location may also be determined via any of the methods described above for determining the location of the platform. The field 825 may be a field configured to receive user input regarding any equipment or safety concerns, such as tailored notes from a supervisor notifying a worker to watch out for a particular conveyor that always has problems.

FIG. 9 schematically depicts a particular view 900 of an operations management system user interface, according to certain embodiments. In some embodiments, the view 900 is displayed in response to a selection of the activities button 605 of FIG. 6A and/or the activities button 903 of FIG. 9. The "activities" feature is associated with a plurality of names corresponding to a group of workers. Prior to the view 900 being displayed, each of a group of workers are associated with one or more tasks that must be completed by a particular time or set of times. Per the view 900, based at least in part on the associating, each group member, the task that each group member must perform, the due date, and status indicators indicating whether the one or more tasks have been completed by the time or due data for each of the group of workers is displayed. For example, the view 900 illustrates that "J Flash" has to perform the "safe work task," which is "Due Today." Likewise, "P. Bunyan" has to perform the "JHA" task, which the status indicator shows is "LATE". As the view 900 illustrates, the "Today" button 905 has been selected to see which tasks that each worker need to perform for that date. However, as shown by the buttons 907 and 911, other tasks associated with other due dates may also be displayed. For example, in response to a user selection of the "week" button 907, a group of names and their associated tasks are listed for tasks that are due that week. In response to a user selection of the "All" button 911, a group of names and their associated tasks are listed for tasks that are due both for a particular week and the particular day set via a calendaring feature.

In response to a user selection of the "My" button 913, the supervisor's (Sally Supervisor) tasks are displayed that are due according to the time period selected. In response to a selection of the history feature 915, a history of tasks are shown that includes a range of previous dates' tasks, due dates, and people associated with those tasks. In some embodiments, this history may be used by a supervisor to assess a particular worker or set of worker's effectiveness over a particular time span. For example, in order to do an end-of-year assessment for promotions, raises, etc., a supervisor may select the history feature 915 to identify whether a worker met his/her deadlines over the past year and has qualitatively performed well. In some embodiments, a learning module may utilize a machine learning algorithm to identify patterns and associations to make predictions using the historical data associated with the history button 915. For example, the module may detect that a particular set of workers always take a two week vacation during a particular month every year. Accordingly, the module may predict that various tasks will not get done during the two week span. Accordingly, the module may be configured to notify a device (e.g., the mobile device of Sally Supervisor) shortly before the two week span. Additionally or alternatively, the module may identify patterns tasks that worker typically and historically struggles with, which may help a supervisor change worker tasks, provide help, etc. in response to receiving an associated notification. Other patterns an associations may be made alternatively or additionally, such as patterns of illness, break times, productive time periods (considering the whole group of workers), non-productive time periods, tasks that are struggle areas (considering the whole group of workers), etc. A notification may be responsively transmitted to a supervisor's device and the supervisor may take appropriate action.

In response to a selection of the icon 917, a user may be prompted to input a new entry, such as a name (e.g., a new employee), the task(s) that need to be performed by the person, and the associated due dates.

FIG. 10 schematically depicts a particular view 1000 of an operations management system user interface, according to certain embodiments. The view 1000 describes when a worker or group of workers have begun/ended a work shift and/or begun/ended a work break. In some embodiments, the view 1000 is displayed in response to a selection of the icon 919 (and/or the icon 608 of FIG. 6A) of a particular worker (P. Bunyan). The view 1000 illustrates that P. Bunyan has validated each start or break except when he ended his break at 21:30. The view 1000 describes a clock-time (e.g., 20:00) each time a worker has checked in and/or checked out (e.g., start/end work shift, start/end break). For example, the view 1000 describes and illustrates that P. Bunyan is scheduled to start by 20:00, which was validated as indicated by the status indicator 923. The view 1000 also describes P. Bunyan also had a late start to his day at 20:05 and took a break at 21:30, each of which have been validated. The view 1000 also illustrates that P. Bunyan has not yet ended his break, as indicated by the empty status indicator 925.

Determining whether a worker has checked in/out or identifying whether check-in/out times have been validated can occur via any suitable technique. For example, referring back to FIG. 1, a user may have within his/her proximity a badge and the user may scan the badge over the badge reader station 140 such that the badge reader station 140 reads an identifier and associates it with a worker's identity. In response to the scanning, a user interface may be provided on the badge reader station 140 that includes buttons of "check-in," "check-out," "break," and "transfer" (i.e., whether the worker is indicating that he/she is switching job tasks) so that a user can select which action he/she will take. In response to a user selection of one of these buttons, the selection indication in embodiments is transmitted to the management entity 110 and/or the mobile computing entity 105, such that it causes the view 1000 to display the corresponding selection, such as a user starting a break at 21:15. Other sensors may be used additionally or alternatively to determine check-in/out times, such as using object recognition cameras, proximity sensors (e.g., RFID reader) located on a wearable device and at a cutoff point (e.g., an RFID tag located at the exit of a room), such that when the sensors are within a proximity or signal strength threshold (i.e., a worker wearing the wearable walks past the exit), a notification can be sent, which causes the view 1000 to be displayed. Any other methods described in FIG. 1 or FIG. 5 may also be used.

FIG. 11 schematically depicts a particular view of an operations management system user interface within a mobile device 1100, according to certain embodiments. In some embodiments, the mobile device 1100 represents the mobile computing entity 105 of FIG. 1. It is understood that although FIG. 11 represents a mobile device, other devices may alternatively be used such as a smartwatch, tablet, touchpad, eyewear displays, etc. FIG. 11 includes various menu bar features, such as the icons 1101, 1103, 1105, and 1107. The "dashboard" icon 1107 represents a home or summary page, which shows an overall effectiveness score for a group of people, which is described in more detail below. The "People" icon 1005 is selectable to display a group of individuals that a person (e.g., Sally Supervisor) oversees. The "operations" button 1103 is selectable to display another view that graphically describes how full a loading vehicle is for a shipment operation, which is described in more detail below. The identifier 1109 describes the supervisor's name who is overseeing associated tasks. The "Tasks" icon 1102 is selectable to display the contents below the identifier 1109, which displays a group of workers (i.e., Mookie Wilson, Sally Supervisor), each task (e.g., "Conveyor Securing," "PTRS Clock-in," etc.) that those workers must complete by a particular time, and status indicators indicating whether one or more tasks have been completed by the particular time for each of the group of workers based at least in part on associating each of the group of workers with one or more tasks that must be completed by the particular time. For example, FIG. 11 illustrates that "Mookie Wilson" is 1 hour late for Mookie's for "Conveyor Securing," as indicated in the "Overdue, 1 hour late" status indicator. Likewise, FIG. 11 illustrates that "Mookie Wilson" has "started" the "A.D.O.P.T" task as indicated in the associated status indicator.

As described above, in various embodiments, it is determined that a worker has "started" or has/has not completed a task based at least in part on analyzing data sampled from one or more sensors. For example, in order to determine whether a worker has "started" a task may be based on proximity-based methods, such as when a reader located on a wearable device of a worker is within a proximity or signal strength threshold of a tag located on a unit of equipment (e.g., the powered asset 100, non-powered asset 103) that the user is working with. In these embodiments, as soon as an individual gets close enough for a reader to interrogate the corresponding tag, an ID associated with both the worker and the unit of equipment can be obtained and transmitted to the management entity 110 and/or the mobile entity 105 such that the transmission causes the mobile device 1101 to display an identifier indicating a worker (based on the worker ID), the task(s) that the worker must perform (based on the equipment ID) and the fact that the worker has "started" a task (based on the sensors being within a proximity threshold). Additionally or alternatively, other sensors may be utilized such as a worker badging in for a particular task (e.g., via the badge reader station 140), object recognition cameras, accelerometers, etc. Likewise, one or more sensors can be utilized to determine whether a task has been completed or "overdue" by a specific quantity of time. For example, in some embodiments the management entity 110 stores a logical counter and a database of clock-times that a task must be completed by via an individual. Accordingly, if no proximity, as described above, is detected by the clock-time threshold that the task must be completed by, the status indicator "overdue" may be responsively displayed to the mobile device 1100 and/or a notification sent to one or more devices. In another example, motion sensors, object recognition cameras, and/or other suitable sensors are utilized to determine whether a task has been completed or overdue by the clock-time threshold described above.

FIG. 12 schematically depicts a particular view 1200 of an operations management system user interface, according to certain embodiments. In some embodiments, the view 1200 is displayed in response to a user selection of the "Operations" icon 1103 of FIG. 11. The view 1200 graphically describes how full or empty a loading vehicle is for a shipment operation. For example, the view 1200 illustrates in entry 21 that the loading vehicle is still 70% empty (or full) and that 5, 127 parcels still need to be loaded (or are already loaded), as indicated by the icon 1211. Entry 22 likewise illustrates that the vehicle is only 50% loaded or full and still requires (or has) 5, 127 parcels, as indicated by the icon 1213. Entry 23 illustrates that the loading vehicle is 25% full (or empty) and still requires (or has already loaded) 960 parcels for loading, as indicated by the icon 1215. Entry 24 illustrates that the loading vehicle is empty or has no parcels loaded, as indicated by the icon 1217.

FIG. 13 schematically depicts a particular view 1300 of an operations management system user interface, according to certain embodiments. In some embodiments, the view 1300 is displayed in response to a user selection of any of the features within the view 1200 (e.g., the icon 1211) and/or the "Operations" icon 1103 of FIG. 11. The move button 1319 indicates a request to change or select a bay for a vehicle. The stage button 1321 corresponds to requesting a vehicle to be loaded and which has already been assigned to a bay/area. The drop down list 1323 allows a user to select a current geographical area (e.g., a worksite, city, state, etc.) that one or more loading vehicles are loaded in. The drop down list 1325 allows a user to select a bay unit or identifiable loading/unloading station that one or more loading vehicles are stationed at within the current area. The status indicator 1327 illustrates that only 30% of the loading vehicle is loaded or 70% remains unloaded. The identifiers indicate the quantity of parcels that still need to be loaded in the associated loading trucks or for the particular bay numbers.

FIG. 14A schematically depicts a particular view 1400 of an operations management system user interface, according to certain embodiments. The view 1400 describes a list of individuals that a supervisor oversees. In some embodiments, the view 1400 is displayed in response to a selection of the "People" icon 1105 of FIG. 11. FIG. 14B schematically depicts a particular view 1400-1 of an operations management system user interface, according to certain embodiments. In some embodiments, the view 1400-1 is displayed in response to a selection of the identifier or associated button 1401 of FIG. 14A. The view 1400-1 allows a supervisor to obtain a snapshot of relevant information associated with a worker the supervisor oversees. For example, the field 1403 illustrates a vacation days profile for a worker; specifically Mookie Wilson has 7 vacation days left Likewise, the field 1405 illustrates an attendance profile of a worker; specifically Mookie Wilson has been late a quantity of 10 times up to date for the month and has called in a total quantity of 5 times and did not call in 1 time. The "attendance" feature 1409 allows a supervisor to see how often an individual was/was not at work and days that the worker clocked in late. The "activity" feature allows a supervisor to see what activities or tasks a user has done and/or still needs to do. The view 1400-1 illustrates that the "All" feature has been selected, which displays a history of data or timeline of activities that a worker (Mookie Wilson) has engaged in, as illustrated under the "All" tab 1407 of the view 1400-1. This also shows how complete a task is. For example, the view 1400-1 illustrates that Mookie Wilson is 90% complete with the "Methods Eval—Load" task that was due on Sep. 26, 2016, which can be determined via any sensor method described above.

FIG. 15 schematically depicts a particular view 1500 of an operations management system user interface, according to particular embodiments. The view 1500 indicates whether one or more individuals have completed a plurality of loading tasks for loading one or more parcels into a delivery truck and how effective the individual was at the loading, as indicated by the "Load Audit" identifier 1501. The feature 1503 identifies that a cornerstone package has been loaded, as indicated by the status indicator checkmark 1523. The feature 1505 indicates that each shelf has been locked in or secured on the right of a loading vehicle. The feature 1507 indicates that there are three levels of shelves (e.g., a bottom shelf, a middle shelf above the bottom shelf, and a top shelf over the middle shelf). The feature 1509 indicates that the parcels have been loaded starting at the back of the loading vehicle to the front of the loading vehicle at a mid-power zone. The feature 1511 indicates that irregular shaped and small parcels have been properly placed within the loading vehicle. The feature 1513 indicates that a load technique used to identify a quality of a load has been properly employed. The feature 1515 indicates that one or more parcels have been correctly loaded to the ceiling. The feature 1517 indicates that all small items have been places in a container of some sort. The feature 1518 indicates that a retainer holding an item is flush against the wall of the loading vehicle. The feature 1519 indicates that there are no damages to any parcel or item. The status indicator 1521 indicates that every one of the tasks have been complete, as indicated by the "100% percent effective" indicia and each of the fields that have been set with check marks.

The various loading tasks described in the view 1500 can be inferred via any suitable technique, such as through one or more sensors. For example, a load sensor configured to determine weight of one or more objects can be used to infer whether an item is "loaded to ceiling," "loaded back to front," etc. Additionally or alternatively, other sensors may be utilized, such as utilizing object recognition cameras configured to detect when there is a damaged good, whether there is a cornerstone package, whether an item is flush against a wall, etc. In another example, the telematics sensors 125 and/or the beacons 150, 107 can be used. For example, it can be inferred whether three level shelves have been placed within a loading vehicle based on proximity sensors attached to each shelf and the vehicle. For example, a first shelf may have a reader that interrogates tags of a second and third shelf and a vehicle, which each have an ID. Accordingly, each ID can be transmitted to the management entity 110 and/or the mobile computing entity 105 such that an inference is made that there are "three level shelves" located in the particular loading vehicle. Responsively, a status indicator of "complete" can be transmitted to a device, which causes the feature 1507 "three Level Shelves" to be displayed as completed.

FIG. 16 schematically depicts a particular view 1600 of an operations management system user interface, according to particular embodiments. The view 1600 indicates whether one or more individuals have the particular tools needed for a sorting operation, as illustrated by the "Pre-Sort Checklist" identifier 1601. The view 1600 indicates that no tool is marked as being used or validated, as illustrated by at least the empty status indicator 1603 (as opposed to a checkmark). Determining whether one or more individuals have the tools they need for a task can be performed via any suitable method. For example, proximity sensors can be attached to any one of the tools illustrated and within a mobile device or any other device (e.g., a wearable) that a user has on his person throughout the day. For example, a smart watch that a user wears can include a tag reader and the "tape gun" the user is supposed to be working with can include a tag. Accordingly, when the tag reader is within a proximity or signal strength threshold of the tag (i.e., the person is within a particular distance of the tool), it can be inferred that the person has selected or is using a tool for a particular task. For example, as soon as the reader interrogates the tag, an ID associated with the tool, task, and person can be transmitted to the management entity 110 and/or the mobile device 105, such that the transmission causes the "Tape Gun" field within the view 1600 to display a status indicator as marked complete or validated.

FIG. 17 schematically depicts a particular view 1700 of an operations management system user interface, according to particular embodiments. FIG. 17 describes a dashboard that indicates an overall effectiveness score in response to completing one or more tasks. The overall effectiveness score indicates or is indicative of an impact (e.g., a financial impact) of an entity (e.g., a business) as a result of each worker completing or not completing one or more tasks for one or more business domains. In some embodiments, the view 1700 is displayed in response to a user selection of the "Dashboard" feature 1107 of FIG. 11. The "Financial" identifier and score within the view 1700 indicates a cost saved in engaging in one or more task operations for a particular period of time (e.g., for the group of workers and tasks indicated in FIG. 11). The "Customer" identifier and score indicates whether one or more customer needs were met while engaging in one or more task operations (e.g., the tasks described in FIG. 11), such as a timing deadline. The "Internal Business Process" identifier and score indicates how effective a process was for completing one or more tasks. For example, if workers have performed load audits as indicated in FIG. 15 by a particular time, if conveyors are properly functioning, as indicated in FIG. 8B and/or any function performed corresponding to any of the FIGS. 8A-17, the "Internal Business Process" score is set or incremented accordingly. The "People" identifier and score indicates whether one or more individuals are preforming tasks correctly and/or are spending enough time on one or more tasks. For example, if workers have all or most of their "due" deadlines, as indicated FIG. 9, have or have correctly performed load audits as indicated in FIG. 15, have correctly secured conveyors as indicated in FIG. 8B, have used correct biomechanics as indicated in FIG. 7A, are efficiently using their time as indicated in FIG. 10, and/or performed any action corresponding to any of the FIGS. 8A-17, the "People" score is set or incremented accordingly. The overall effectiveness score or "balanced score card" is generated based at least in part on one or more of these individual scores described above. For example, the view 1700 illustrates that the "BSC Effective" score is "66%". This can be used by individuals, such as supervisors, to determine how effective one or more operations are and what individual scores demand more attention. The overall effectiveness score can be based at least in part on obtaining one or more sensor readings derived from one or more sensors. For example, sensors located within a delivery vehicle, on a wearable device of a user, and/or one or more worker tools as described in any of the examples herein can be used to generate the overall effectiveness score.

FIG. 18 schematically depicts a particular view 1800 of an operations management system user interface, according to particular embodiments. The view 1800 describes a plurality of status indicators indicating whether one or more work sectors and/or geographical areas are in need of immediate attention. For example, the status indicator 1801 indicates that the "HFCS" work sector is not in need of any attention. Alternatively, the status indicator 1803 indicates that the "HUBCOM" work sector needs immediate attention. In particular embodiments, the status indicators are set based on real-time or near-real-time data received from one or more sensors for particular assigned tasks, as described above. For example, an accelerometer located on a conveyor belt apparatus may suddenly spike or stop indicating that a conveyor has stopped working. Accordingly, an identifier and notification can responsively be sent to the management entity 110 and/or a supervisor device shortly after the detection, which causes the status indicator 1803 to be set and displayed for the particular problem for those working with the conveyors. In this way a supervisor can tend to the problem quickly. In some embodiments, the supervisor can then drill down to see more specific details, such as those described in FIG. 8B. In another example, a load or other sensor may indicated that not enough parcels are being loaded or a truck is not loaded with parcels by a particular date. As soon as the date passes and/or shortly before the date passes, a notification can then be transmitted, which causes the status indicator 1803 to be displayed. Real-time updates and notifications may also be made based on time-card readings, such as those indicated in FIG. 10. For example, if a user has not yet checked-in after a 2 hour break threshold, a notification can be transmitted, which causes the status indicator 1803 to be set and displayed. Real-time updates and notification may also be made based on each worker's effectiveness score.

III. Exemplary Operation

As noted above, example embodiments provide various views of an operations management user interface, which may be distinguished in terms of first view, second view, etc. The terms first (e.g., first view), second (e.g., second view), third, etc. are not to be construed as denoting or implying order, time sequences, or any specific component makeup unless expressly indicated otherwise. Rather, they are to be construed as distinguishing two or more elements. For example, a first view, second view, third view, etc. may distinguish some or each of the views as represented in FIGS. 6A through 18

FIG. 19 is a flow diagram of an example process 1900 for displaying a plurality of status indicators showing whether one or more tasks have been completed by a first time, according to certain embodiments. The process 1900 may be performed by processing logic that comprises hardware (e.g., circuitry, dedicated logic, programmable logic, microcode, etc.), software (e.g., instructions run on a processor to perform hardware simulation), firmware, or a combination thereof. For example, some or each of the blocks in the process 1700 may be performed by logic within the management entity 110 and/or mobile computing entity 105 of FIG. 1. It is understood that although FIG. 19 is described with reference to a particular order and particular quantity of blocks, any quantity of blocks may exist, which flow in any order.

Per block 1901, a first feature associated with a plurality of names corresponding to a group of workers is displayed. For example, the first feature may be the icon 1101 of FIG. 11 and/or the "People" button 603 of FIG. 6A. Per block 1903, each of the group of workers are associated with one or more tasks that must or are targeted to be completed by a first time. For example, this association may be displayed by the view 900 of FIG. 9 and/or FIG. 1, which indicates various tasks, workers that must complete the tasks, and due dates. Per block 1905, a plurality of status indicators indicating whether the one or more tasks have been completed by the first time are displayed for the each of the group of workers. For example, block 1905 may be illustrated by the view 900 of FIG. 9 and/or FIG. 1, which displays various tasks, workers that must complete the tasks, due dates that the workers must complete their task(s) by, and status indicators indicating whether a corresponding task has been "started" or is "overdue."

FIG. 20 is a flow diagram of an example process 2000 for generating and displaying an overall effectiveness score based on other individual scores, according to certain embodiments. The process 2000 may be performed by processing logic that comprises hardware (e.g., circuitry, dedicated logic, programmable logic, microcode, etc.), software (e.g., instructions run on a processor to perform hardware simulation), firmware, or a combination thereof. For example, some or each of the blocks in the process 1700 may be performed by logic within the management entity 110 and/or mobile computing entity 105 of FIG. 1. It is understood that although FIG. 20 is described with reference to a particular order and particular quantity of blocks, any quantity of blocks may exist, which flow in any order.

Per block 2001, a financial score is generated and displayed, which indicates a cost saved in engaging in one or more task operations. For example, the financial score in embodiments is analogous to the "Financial" score indicated in FIG. 17. Per block 2003, a customer score is generated and displayed, which indicates whether one or more customer needs were met in engaging in the one or more task operations. For example, this may be indicated by the "Financial" score of 29.61, as described in FIG. 17. Per block 2005, an internal business process score is generated and displayed, which indicates how effective a process was for completing the one the one or more task operations. For example, this may be indicated by the "Internal Business Process" score 22.49, as described in FIG. 17. Per block 2007, a people score is generated and displayed, which indicates whether one or more individuals are performing one or more tasks correctly and are spending enough time on the one or more tasks. For example, the people score in embodiments corresponds to the "people" score as described in FIG. 17. Per block 2009, an overall effectiveness score is generated and displayed based at least on the financial score, customer score, internal business process score, and/or the people score. For example, referring back to FIG. 17, the overall effectiveness score may be the "Balanced Score Card" as described in the view 1700.

It is recognized that any of the processes 1900, 2000, and/or any functions associated with any of the FIGS.

6A-FIG. 18 in various embodiments is implemented in conjunction with the computing environment/devices as described in FIGS. 1-5.

IV. Conclusion

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A computer-implemented method comprising:
   associating, by at least one processor, each worker of a set of workers with one or more tasks that are scheduled to be completed by a first time;
   based at least in part on the associating, generating, by the at least one processor, a summary page of a user interface, the summary page includes: a first set of indicators representing the set of workers and a second set of indicators representing the one or more tasks;
   receiving a first indication of whether the each worker of the set of workers has completed the one or more tasks by the first time;
   at least partially in response to the receiving of the first indication, generating, by the at least one processor and at the summary page, a status indicator indicating whether the one or more tasks have been completed by the first time;
   based at least in part on whether the each worker of the set of workers has completed the one or more tasks by the first time, receiving, by the at least one processor, a second indication of at least one score indicative of an impact on an entity as a result of the each worker completing or not completing the one or more tasks by the first time; and
   in response to a user selection of a user interface element at the summary page, generating, by the at least one processor and at a second page, a third indicator representing the at least one score.

2. The computer-implemented method of claim 1, wherein the at least one score includes a score indicating a cost saved for the entity based on the set of workers completing or not completing the one or more tasks by the first time.

3. The computer-implemented method of claim 1, wherein the at least one score includes a customer score indicating whether one or more customer needs were met in engaging in the one or more tasks.

4. The computer-implemented method of claim 1, further comprising receiving an overall effectiveness score based at least in part on a customer score indicating whether one or more customer needs were met in engaging in the one or more tasks, wherein the overall effectiveness score is further based on a financial score that indicates a cost saved for an entity based on the set of workers completing or not completing the one or more tasks by the first time.

5. The computer-implemented method of claim 4, wherein the overall effectiveness score is based at least in part on obtaining a plurality of sensor readings derived from a plurality of sensors: on a delivery vehicle, on a wearable device of a user, and on one or more worker tools.

6. The computer-implemented method of claim 1, further comprising:
   causing display of an internal process score indicating how effective a process was for completing the one or more tasks; and
   causing display of a people score indicating whether individuals are performing a task correctly and are spending enough time on the one or more tasks.

7. The computer-implemented method of claim 1, wherein the first indication is based on an inference of one or more sensors, and wherein the one or more sensors include a beacon located on a container and one or more accelerometers on a conveyor.

8. An apparatus comprising at least one processor and at least one memory storing computer program code, wherein the at least one memory and the computer program code is configured to, with the at least one processor, cause the apparatus to:
   associate each worker of a set of workers with one or more tasks that are scheduled to be completed by a first time;
   based at least in part on the associating, cause display of a summary page of a user interface, the summary page includes: a first set of indicators representing the set of workers and a second set of indicators representing the one or more tasks;
   determine whether the each worker of the set of workers has completed the one or more tasks by the first time;
   at least partially in response to the determining, cause display, at the summary page, of a status indicator indicating whether the one or more tasks have been completed by the first time;
   based at least in part on the determining whether the each worker of the set of workers has completed the one or more tasks by the first time, generate at least one score indicative of an impact on an entity as a result of the each worker completing or not completing the one or more tasks by the first time; and
   cause display, at the summary page or a second page, of a third indicator representing the at least one score.

9. The apparatus of claim 8, wherein the at least one score includes a customer score indicating whether one or more customer needs were met in engaging in the one or more tasks.

10. The apparatus of claim 8, wherein the apparatus is further caused to generate an overall effectiveness score based at least in part on a customer score indicating whether one or more customer needs were met in engaging in the one or more tasks, wherein the overall effectiveness score is further based on a financial score that indicates a cost saved for an entity based on the set of workers completing or not completing the one or more tasks by the first time.

11. The apparatus of claim 10, wherein the overall effectiveness score is based at least in part on obtaining a plurality of sensor readings derived from a plurality of sensors: on a delivery vehicle, on a wearable device of a user, and on one or more worker tools.

12. The apparatus of claim 8, wherein the apparatus is further caused to:
   cause display of an internal business process score indicating how effective a process was for completing the one or more tasks; and
   cause display of a people score indicating whether individuals are performing a task correctly and are spending enough time on the one or more tasks.

13. The apparatus of claim 8, wherein the determining is based on an inference of one or more sensors, and wherein the one or more sensors include a beacon located on a container and one or more accelerometers on a conveyor.

14. A computer program product comprising at least one non-transitory computer-readable storage medium having computer-executable program code instructions stored therein, the computer-executable program code instructions comprising program code instructions configured to, when executed by a processor of a computing system, cause the computing system to:
- associate each worker of a set of workers with one or more tasks that are scheduled to be completed by a first time;
- cause display of a first page of a user interface, the first page includes: a first set of indicators representing the set of workers and a second set of indicators representing the one or more tasks;
- determine whether the each worker of the set of workers has completed the one or more tasks by the first time;
- at least partially in response to the determining, cause display, at the first page, of a status indicator indicating whether the one or more tasks have been completed by the first time;
- based at least in part on the determining whether the each worker of the set of workers has completed the one or more tasks by the first time, generate at least one score indicative of an impact on an entity as a result of the each worker completing or not completing the one or more tasks by the first time; and
- cause display, at the first page or a second page, of the at least one score.

15. The computer program product of claim 14, wherein the at least one score includes a financial score indicating a cost saved for the entity based on the set of workers completing or not completing the one or more tasks by the first time.

16. The computer program product of claim 14, wherein the at least one score includes a customer score indicating whether one or more customer needs were met in engaging in the one or more tasks.

17. The computer program product of claim 14, wherein the program instructions further cause the computing system to generate an overall effectiveness score based at least in part on a customer score indicating whether one or more customer needs were met in engaging in the one or more tasks, wherein the overall effectiveness score is further based on a financial score that indicates a cost saved for an entity based on the set of workers completing or not completing the one or more tasks by the first time.

18. The computer program product of claim 17, wherein the overall effectiveness score is based at least in part on obtaining a plurality of sensor readings derived from a plurality of sensors: on a delivery vehicle, on a wearable device of a user, and on one or more worker tools.

19. The computer program product of claim 14, wherein the program instructions further cause the computing system to:
- cause display of an internal business process score indicating how effective a process was for completing the one or more tasks; and
- cause display of a people score indicating whether individuals are performing a task correctly and are spending enough time on the one or more tasks.

20. The computer program product of claim 14, wherein the determining is based on an inference of one or more sensors, and wherein the one or more sensors include a beacon located on a container and one or more accelerometers on a conveyor.

* * * * *